United States Patent
Kato

(10) Patent No.: US 11,390,251 B2
(45) Date of Patent: Jul. 19, 2022

(54) MOBILE DEVICE AND AUTHENTICATION SYSTEM

(71) Applicant: DENSO CORPORATION, Kariya (JP)

(72) Inventor: Shinichiro Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 16/822,789

(22) Filed: Mar. 18, 2020

(65) Prior Publication Data

US 2020/0216028 A1  Jul. 9, 2020

Related U.S. Application Data

(63) Continuation of application No. PCT/JP2018/031393, filed on Aug. 24, 2018.

(30) Foreign Application Priority Data

Oct. 19, 2017  (JP) .............................. JP2017-202735

(51) Int. Cl.
| | |
|---|---|
| *B60R 25/32* | (2013.01) |
| *H04W 12/06* | (2021.01) |
| *H04B 5/00* | (2006.01) |
| *B60R 25/24* | (2013.01) |
| *G07C 5/08* | (2006.01) |
| *G01P 15/08* | (2006.01) |
| *G01P 21/00* | (2006.01) |
| *H04W 12/64* | (2021.01) |

(52) U.S. Cl.
CPC .............. *B60R 25/32* (2013.01); *B60R 25/24* (2013.01); *G01P 15/08* (2013.01); *G01P 21/00* (2013.01); *G07C 5/0808* (2013.01); *H04B 5/0031* (2013.01); *H04W 12/06* (2013.01); *H04W 12/64* (2021.01); *B60R 2325/103* (2013.01)

(58) Field of Classification Search
CPC ... B60R 25/32; B60R 25/24; B60R 2325/103; H04W 12/64; H04W 12/06; G01P 15/08; G01P 21/00; G07C 5/0808; H04B 5/0031
USPC ....................................................... 701/29.2
See application file for complete search history.

(56) References Cited

U.S. PATENT DOCUMENTS

| | | | |
|---|---|---|---|
| 2009/0201375 A1* | 8/2009 | Babala ................. | G01C 25/005 348/187 |
| 2016/0187368 A1* | 6/2016 | Modi ..................... | G08B 29/04 702/141 |
| 2020/0044485 A1* | 2/2020 | Smith .................... | H02J 50/50 |

FOREIGN PATENT DOCUMENTS

| | | | |
|---|---|---|---|
| JP | H05273226 A | | 10/1993 |
| JP | H11-71948 A | | 3/1999 |
| JP | 2007069712 A | * | 3/2007 |
| JP | 2010024746 A | * | 2/2010 |
| JP | 2010053632 A | * | 3/2010 |

(Continued)

*Primary Examiner* — Yong Hang Jiang
(74) *Attorney, Agent, or Firm* — Harness, Dickey & Pierce, P.L.C.

(57) ABSTRACT

A mobile device for an authentication system that performs authentication to control an authentication target with code verification via near field wireless communication, includes: an acceleration sensor; a communication portion that performs the near field wireless communication with an antenna of the authentication target; a reception stop portion that stops reception operation of the communication portion; a fault detection portion that detects a failure in the acceleration sensor; and an operation change portion that prevents the reception stop portion from stopping the reception operation.

13 Claims, 16 Drawing Sheets

(56) References Cited

FOREIGN PATENT DOCUMENTS

| | | |
|---|---|---|
| JP | 2015074311 A | 4/2015 |
| JP | 2016088156 A | 5/2016 |

\* cited by examiner

MOBILE DEVICE AND AUTHENTICATION SYSTEM

CROSS REFERENCE TO RELATED APPLICATIONS

The present application is a continuation application of International Patent Application No. PCT/JP2018/031393 filed on Aug. 24, 2018, which designated the U.S. and claims the benefit of priority from Japanese Patent Application No. 2017-202735 filed on Oct. 19, 2017. The entire disclosures of all of the above applications are incorporated herein by reference.

TECHNICAL FIELD

The present disclosure relates to a mobile device and an authentication system including the mobile device.

BACKGROUND

As a comparative example, a mobile device for a system that controls operations of in-vehicle instruments according to results of code verification using wireless communication has been proposed.

SUMMARY

A mobile device for an authentication system that may perform authentication to control an authentication target with code verification via near field wireless communication, may include: an acceleration sensor; a communication portion that may perform the near field wireless communication with an antenna of the authentication target; a reception stop portion that may stop reception operation of the communication portion; a fault detection portion that may detect a failure in the acceleration sensor; and an operation change portion that may prevent the reception stop portion from stopping the reception operation.

BRIEF DESCRIPTION OF DRAWINGS

The above object and other objects, features and advantages of the present disclosure will become more apparent from the following detailed description with reference to the attached drawings. In the drawings.

DETAILED DESCRIPTION

Figure 1:
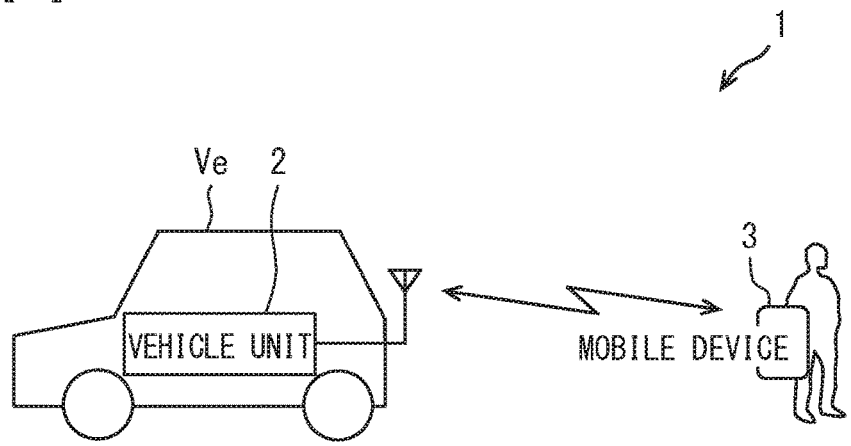
FIG. 1 is a diagram illustrating one example of a schematic configuration of an authentication system.

As a comparative example, a mobile device for a system that controls operations of in-vehicle instruments according to results of code verification using wireless communication has been proposed. The mobile device stops a reception operation and allows an acceleration sensor included in the mobile device to detect vibrations. Based on a pattern of the vibrations, the mobile device restarts the reception operation only during a period of a state where the mobile device is carried by a walking user and also during a predetermined period after the state. The mobile device of the comparative example aims at power saving by performing the reception operation when the user approaches a vehicle and only during a predetermined period after which the user gets on the vehicle.

The technology of the comparative example does not detect vibrations when the acceleration sensor of the mobile device fails. The reception operation remains inactive uselessly even when the user carrying the mobile device approaches the vehicle. It is likely to be incapable of code verification using wireless communication.

One example of the present disclosure provides a mobile device and an authentication system capable of power saving of the mobile device by using an acceleration sensor and capable of preventing the useless continuation of operation for power saving.

According to one example embodiment, a mobile device for an authentication system that may perform authentication to control an authentication target with code verification via near field wireless communication, may include: an acceleration sensor; a communication portion that may perform the near field wireless communication with an antenna of the authentication target; a reception stop portion that may stop reception operation of the communication portion based on a detection result from the acceleration sensor; a fault detection portion that may detect a failure in the acceleration sensor; and an operation change portion that may prevent the reception stop portion from stopping the reception operation of the communication portion when the fault detection portion may detect the failure in the acceleration sensor.

According to another example embodiment, an authentication system may include: an instrument of an authentication target; and a mobile device carried by a user. The instrument of the authentication target may perform authentication to control the authentication target with code verification via near field wireless communication between an antenna of the authentication target and the mobile device. The mobile device may include: an acceleration sensor; a communication portion that may perform the near field wireless communication with the antenna; a reception stop portion that may stop reception operation of the communication portion based on a detection result from the acceleration sensor; a fault detection portion that may detect a failure in the acceleration sensor; and an operation change portion that may prevent the reception stop portion from stopping the reception operation of the communication portion when the failure detection portion may detect the failure in the acceleration sensor.

According to the example embodiments, the reception operation by the communication portion performing the near field wireless communication used for the code verification is stopped based on the detection result from the acceleration sensor. Therefore, in comparison to the case where the reception operation constantly continues, it may be possible to implement power saving of the mobile device. The failure of this acceleration sensor is detected by the fault detection portion. When the fault detection portion detects the failure in the acceleration sensor, the operation change portion prevents the reception stop portion from stopping the reception operation by the communication. Therefore, when this acceleration sensor fails, it is possible to avoid unnecessarily continuing to stop the reception operation for performing power saving. As the result, while implementing the power saving of the mobile device, it is possible to avoid unnecessarily continuing to stop the operation for performing power saving when this acceleration sensor fails.

The description below shows multiple embodiments of the present disclosure with reference to the accompanying drawings. For the purpose of illustration, the same reference numerals or symbols are given to parts having the same functions as those of the parts shown in the drawings used to describe the preceding one or more of the embodiments and description may be omitted. A part assigned the same numeral or symbol can be referenced to the description in the other embodiments.

First Embodiment

<Schematic Configuration of an Authentication System 1>

The first embodiment of the present disclosure will be described with reference to the accompanying drawings. As illustrated in FIG. 1, the authentication system 1 includes a vehicle unit 2 used for a vehicle Ve and a mobile device 3 carried by a user. The authentication system 1 includes a function that performs code verification between the vehicle unit 2 and the mobile device 3 by using near field wireless communication and when the code verification succeeds, permits locking or unlocking a vehicle door and/or permits starting a travel drive source.

<Schematic Configuration of the Vehicle Unit 2>

Figure 2:
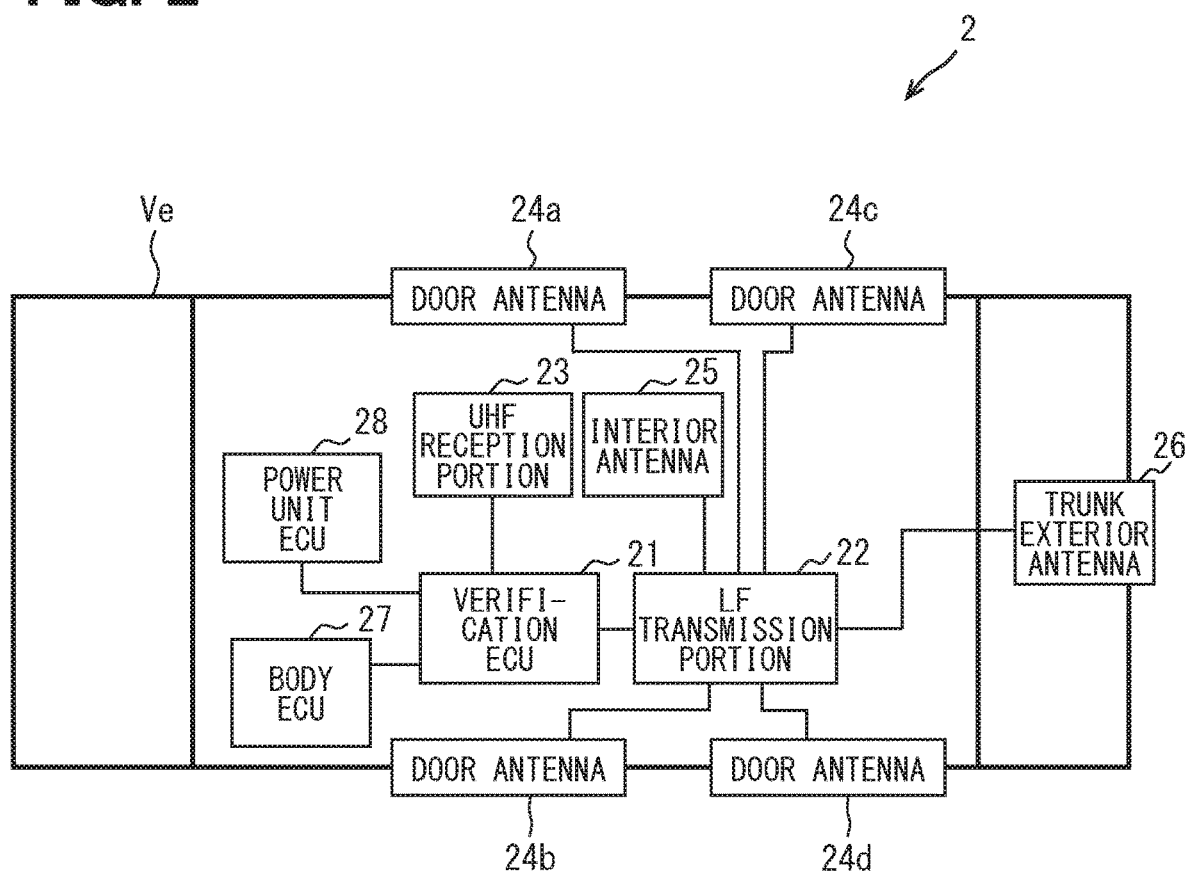
FIG. 2 is a diagram illustrating one example of a schematic configuration of a vehicle unit.

The description below shows a schematic configuration of the vehicle unit 2 with reference to FIG. 2. FIG. 2 is a diagram illustrating a schematic configuration of the vehicle unit 2. As illustrated in FIG. 2, the vehicle unit 2 includes a verification ECU 21, an LF transmission portion 22, a UHF reception portion 23, door antennas 24a through 24d, an interior antenna 25, a trunk exterior antenna 26, a body ECU 27, and a power unit ECU 28.

The LF transmission portion 22 transmits a request signal to the mobile device 3 by using the LF-band radio wave via LF antennas such as the door antennas 24a through 24d, the interior antenna 25, and the trunk exterior antenna 26. The LF band is a frequency band of 30 kHz through 300 kHz, for example. A communication range capable of transmitting signals from the LF antenna by using the LF-band radio wave corresponds to a near field wireless communication area capable of near field wireless communication. The request signal requests transmission of an identification code from the mobile device 3 for the code verification.

The door antenna 24a is provided near a vehicle door at a driver's seat. The door antenna 24b is provided near a vehicle door at a passenger seat. The door antenna 24c is provided near a vehicle door at a right rear seat. The door antenna 24d is provided near a vehicle door at a left rear seat. The interior antenna 25 is provided in a vehicle compartment. The trunk exterior antenna 26 is provided near a trunk room door belonging to vehicle doors.

A near field wireless communication area for the door antenna 24a is limited near the vehicle door at the driver's seat. A near field wireless communication area for the door antenna 24b is limited near the vehicle door at the passenger seat. A near field wireless communication area for the door antenna 24c is limited near the vehicle door at the right rear seat. A near field wireless communication area for the door antenna 24d is limited near the vehicle door at the left rear seat. A near field wireless communication area for the interior antenna 25 is limited in the vehicle compartment. A near field wireless communication area for the trunk exterior antenna 26 is limited near the trunk room door. Near field wireless communication areas for the door antennas 24a through 24d and the trunk exterior antenna 26 extend outside the vehicle compartment of the vehicle Ve. The door antennas 24a through 24d, the interior antenna 25, and the trunk exterior antenna 26 correspond to antennas.

The UHF reception portion 23 includes a UHF antenna and uses the UHF antenna to receive a response signal transmitted from the mobile device 3 by using the UHF-band radio wave. The UHF band is a frequency band of 300 MHz through 3 GHz, for example. The response signal includes an identification code returned from the mobile device 3 in response to the above-described request signal.

The body ECU 27 locks or unlocks the vehicle doors by outputting a drive signal to a door lock motor provided for each vehicle door. This drive signal controls the lock and unlock of each vehicle door. The body ECU 27 connects with a touch sensor provided for an outer door handle of each vehicle door and detects that a user touches the outer door handle of the vehicle door. The body ECU 27 also connects with a courtesy switch of each vehicle door to detect opening and closing of the vehicle door and connects with a seating sensor to detect whether an occupant is seated.

The power unit ECU 28 is an electronic control unit to control an internal combustion engine or a motor generator of the vehicle Ve. The power unit ECU 28 receives a start permission signal to start the travel drive source from the verification ECU 21 and then makes the internal combustion engine or the motor generator of the vehicle Ve ready to start.

The verification ECU 21 includes a processor, memory, I/O, and a bus connecting these components. The verification ECU 21 performs various processes concerning the authentication of the vehicle Ve by executing a control program stored in the memory. The memory is a non-transitory tangible storage medium that permanently stores computer-readable programs and data. The non-transitory tangible storage medium is available as a semiconductor memory or a magnetic disk.

<Detailed Configuration of the Verification ECU 21>

Figure 3:
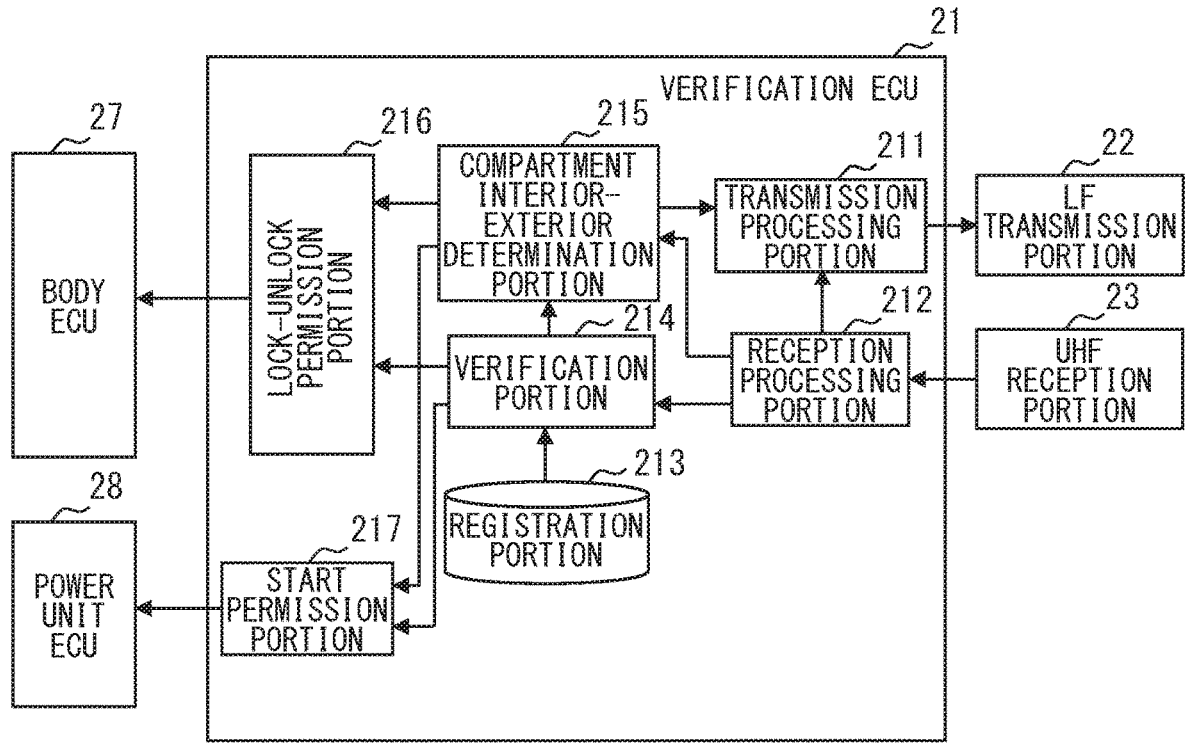
FIG. 3 is a diagram illustrating one example of a schematic configuration of a verification ECU.

With reference to FIG. 3, the description below shows a schematic configuration of the verification ECU 21. As illustrated in FIG. 3, the verification ECU 21 includes function blocks such as a transmission processing portion 211, a reception processing portion 212, a registration portion 213, a verification portion 214, a compartment interior-exterior determination portion 215, a lock-unlock permission portion 216, and a start permission portion 217. The verification ECU 21 corresponds to an authentication-target-coupled instrument. All or part of the functions performed by the verification ECU 21 may be configured by the use of one or more ICs as hardware, for example. All or part of the function blocks included in the verification ECU 21 may be implemented by a combination of software executed by the processor and the hardware members.

The transmission processing portion 211 allows the LF transmission portion 22 to transmit a request signal from the door antennas 24a through 24d, the interior antenna 25, and the trunk exterior antenna 26. The request signal contains a vehicle identification code to identify a vehicle. The vehicle identification code may be a device ID of the verification ECU 21 mounted on the vehicle or a vehicle ID of the vehicle. The vehicle identification code may be stored in the non-volatile memory of the verification ECU 21 so that the vehicle identification code can be read for later use. The reception processing portion 212 receives a response signal via the UHF reception portion 23. In response to the request signal, the response signal is transmitted via UHF-band radio wave from the mobile device 3.

The registration portion 213 is provided as an electrically rewritable nonvolatile memory, for example, and registers a mobile device identification code that identifies the mobile device 3 for a legitimate user. Generally, the mobile device identification code identifies the mobile device 3. The verification portion 214 performs the code verification to determine whether the response signal received by the reception processing portion 212 is transmitted from the mobile device 3 for the legitimate user. The code verification is performed between a mobile device identification code contained in the response signal received from the mobile device 3 and a mobile device identification code registered to the registration portion 213.

The compartment interior-exterior determination portion 215 determines whether the mobile device 3 is located inside or outside the vehicle compartment. For example, when the interior antenna 25 transmits a request signal and a response signal is received from the mobile device 3, the mobile device 3 is determined to be located inside the vehicle compartment. However, when any one of the door antennas 24a through 24d and the trunk exterior antenna 26 transmits a request signal and a response signal is received from the mobile device 3 but the interior antenna 25 transmits a request signal and no response signal is received from the mobile device 3, the mobile device 3 is determined to be located outside the vehicle compartment.

The exterior verification succeeds when the compartment interior-exterior determination portion 215 determines the mobile device 3 to be located outside the vehicle compartment and the verification portion 214 succeeds in the code verification. In this case, the lock-unlock permission portion 216 transmits a signal to permit locking or unlocking each vehicle door to the body ECU 27. For example, when a configuration in which the transmission processing portion 211 periodically transmits a request signal after the vehicle Ve is locked is employed, the following configuration may be employed. When the vehicle door lock-unlock is permitted, the body ECU 27 starts energizing the touch sensor provided for the outer door handle of each vehicle door to activate a standby state capable of detecting the door handle manipulation by the user. When the body ECU 27 detects that the user touches the touch sensor, the body ECU 27 outputs a drive signal to the door lock motor to lock or unlock the vehicle door. In a case where the configuration in which the transmission processing portion 211 transmits a request signal based on a trigger that detects the contact between the user and the touch sensor provided for the outer door handle may be employed, when the vehicle door lock-unlock is permitted in this case, the body ECU 27 outputs a drive signal to the door lock motor to lock or unlock the vehicle door.

The interior verification succeeds when the compartment interior-exterior determination portion 215 determines the mobile device 3 to be located inside the vehicle compartment and the verification portion 214 succeeds in the code verification. In this case, the start permission portion 217 transmits a start permission signal for the travel drive source to the power unit ECU 28. As above, the power unit ECU 28 receives the start permission signal and then makes the internal combustion engine or the motor generator of the vehicle Ve ready to start.

<Schematic Configuration of the Mobile Device 3>

Figure 4:
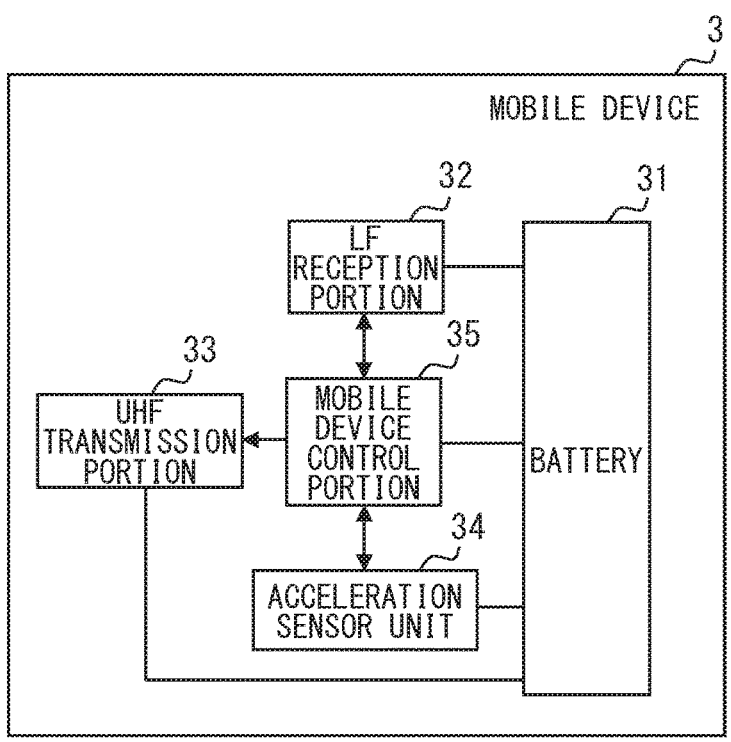
FIG. 4 is a diagram illustrating one example of a schematic configuration of a mobile device.

With reference to FIG. 4, the description below shows the mobile device 3. As illustrated in FIG. 4, the mobile device 3 includes a battery 31, an LF reception portion 32, a UHF transmission portion 33, an acceleration sensor unit 34, and a mobile device control portion 35. The mobile device 3 may be an electronic key for the vehicle Ve, for example.

The battery 31 corresponds to a power supply that supplies the power to operate the mobile device 3. The battery 31 may be a primary battery such as a lithium battery, for example. The LF reception portion 32 allows the LF antenna to receive a request signal transmitted from the vehicle unit 2 by using the LF-band radio wave. The LF reception portion 32 corresponds to a communication portion. The UHF transmission portion 33 allows the UHF antenna to transmit signals output from the mobile device control portion 35 by using the UHF-band radio wave. The acceleration sensor unit 34 detects acceleration speeds resulting from motions of the mobile device 3 and outputs a detection result to the mobile device control portion 35. The acceleration sensor unit 34 will be described in detail later.

The mobile device control portion 35 may include an IC or a microcomputer mainly comprised of a processor and memory, for example. The mobile device control portion 35 performs various processes by executing a control program stored in the memory. The memory is a non-transitory tangible storage medium that permanently stores computer-readable programs and data. The non-transitory tangible storage medium is implemented by a semiconductor memory or a magnetic disk. The mobile device control portion 35 will be described in detail later.

<Schematic Configuration of the Acceleration Sensor Unit 34>

Figure 5:
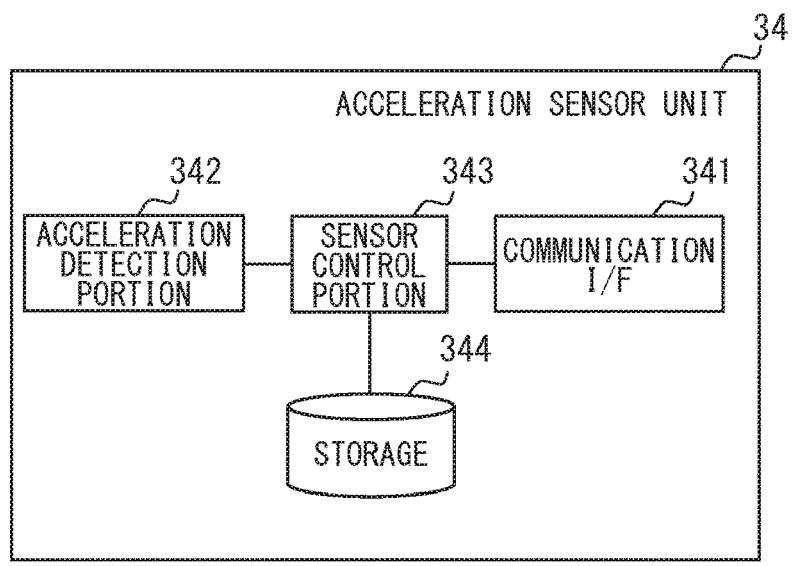
FIG. 5 is a diagram illustrating one example of a schematic configuration of an acceleration sensor unit.

With reference to FIG. 5, the description below shows a schematic configuration of the acceleration sensor unit 34. As illustrated in FIG. 5, the acceleration sensor unit 34 includes a communication interface (communication I/F) 341, an acceleration detection portion 342, a sensor control portion 343, and a storage portion 344. The acceleration sensor unit 34 corresponds to an acceleration sensor.

The communication I/F 341 connects the acceleration sensor unit 34 and the mobile device control portion 35. The acceleration detection portion 342 includes three detection axes (X, Y, and Z) orthogonal to each other and is assumed to be a three axis acceleration sensor to measure accelerations acting in the respective axis directions. The acceleration detection portion 342 is assumed to be a capacitance type MEMS acceleration sensor that is manufactured through the use of the MEMS (Micro Electro Mechanical Systems) technology and detects an acceleration based on a change in the capacitance between electrodes.

The sensor control portion 343 allows the storage portion 344 to successively store accelerations successively detected by the acceleration detection portion 342. The storage portion 344 may be, for example, a volatile memory such as RAM. The sensor control portion 343 allows the storage portion 344 to store accelerations corresponding to the three detection axes.

Figure 6:
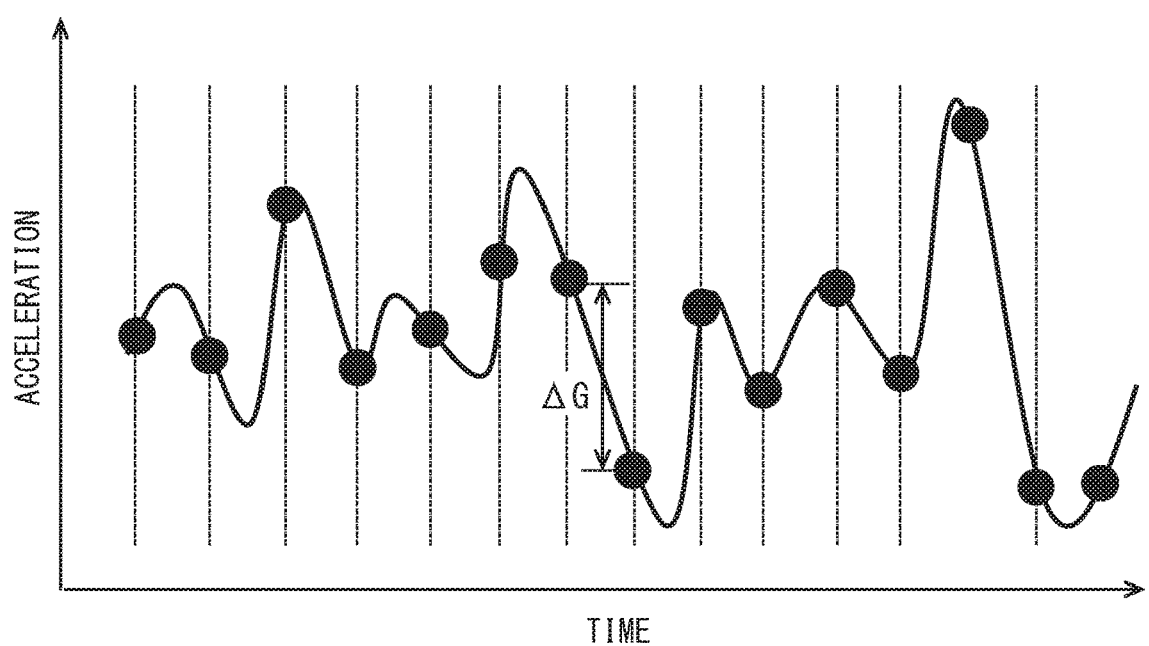
FIG. 6 is a diagram illustrating one example of a waveform of accelerations successively detected by an acceleration detection portion.

As illustrated in FIG. 6, there occurs difference ΔG between samples of accelerations successively detected by the acceleration detection portion 342. The sensor control portion 343 determines whether difference ΔG exceeds a predetermined threshold value. When the threshold value is exceeded, the sensor control portion 343 assumes that vibration is detected. Then, the sensor control portion 343 stores a vibration detection history in the storage portion 344 or outputs a vibration detection signal to the mobile device control portion 35. The vibration detection signal indicates the detection of vibration. FIG. 6 illustrates a waveform of accelerations successively detected by the acceleration detection portion 342. A black dot represents a detection result. The predetermined threshold value is used to distinguish an estimated acceleration from vibration due to the movement of a user carrying the mobile device 3. The predetermined threshold value can be set to any value. For example, the sensor control portion 343 stores the vibration detection history when at least one of the three detection axes exceeds the predetermined threshold value. The difference ΔG of the acceleration is one example of a change quantity of the acceleration.

<Schematic Configuration of the Mobile Device Control Portion 35>

Figure 7:
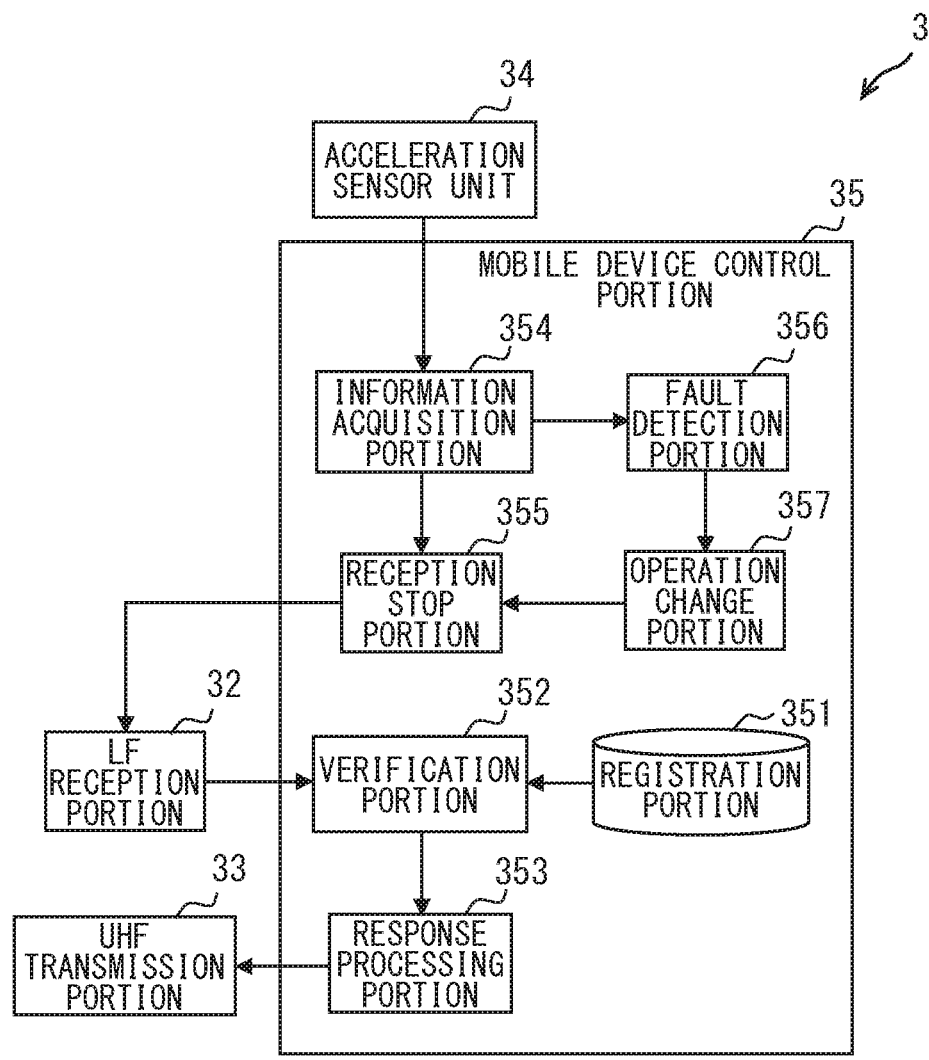
FIG. 7 is a diagram illustrating one example of a schematic configuration of a mobile device control portion.

With reference to FIG. 7, the description below shows a schematic configuration of the mobile device control portion 35. As illustrated in FIG. 7, the mobile device control portion 35 includes function blocks such as a registration portion 351, a verification portion 352, a response processing portion 353, an information acquisition portion 354, a reception stop portion 355, a fault detection portion 356, and an operation change portion 357. All or part of the functions performed by the mobile device control portion 35 may be configured by the use of one or more ICs as hardware, for example. All or part of the function blocks included in the mobile device control portion 35 may be implemented by a combination of software executed by the processor and hardware members.

The registration portion 351 is provided as an electrically rewritable nonvolatile memory, for example, and registers a vehicle identification code for the vehicle Ve. The verification portion 352 verifies a vehicle identification code contained in the request signal received by the LF reception portion 32 and a vehicle identification code registered to the registration portion 351. When the verification portion 352 succeeds in the verification, the response processing portion 353 allows the UHF transmission portion 33 to return a response signal containing the mobile device identification code for the local device. When the verification portion 352 fails in the verification, the response processing portion 353 prevents the UHF transmission portion 33 from returning a response signal. The mobile device identification code for the local device may be stored in the non-volatile memory so that the mobile device identification code can be read for later use.

The information acquisition portion 354 acquires information from the acceleration sensor unit 34. For example, the information acquisition portion 354 acquires the above-described vibration detection signal output from the acceleration sensor unit 34. Besides, the information acquisition portion 354 acquires the vibration detection history stored in the storage portion 344 of the acceleration sensor unit 34 or acquires accelerations (three axis accelerations) corresponding to the three detection axes.

The reception stop portion 355 stops the reception operation on the LF reception portion 32 based on a detection result from the acceleration detection portion 342. For example, the reception stop portion 355 stops the reception operation on the LF reception portion 32 except during a period in which the information acquisition portion 354 acquires the vibration detection signal and except during a predetermined period elapsed after the vibration detection signal is not acquired. In other words, the reception stop portion 355 does not stop the reception operation on the LF reception portion 32 during a period in which the information acquisition portion 354 acquires the vibration detection signal and during the predetermined period elapsed after the vibration detection signal is not acquired. The reception operation is performed when the user approaches the vehicle and only during a predetermined period after the user gets on the vehicle, making power saving available for the mobile device 3.

The predetermined period can be set to any value, and, for example, set to ten minutes or the like. When the information acquisition portion 354 acquires the vibration detection signal, this signifies that the change quantity of the acceleration detected by the acceleration detection portion 342 exceeds the above-described predetermined threshold value. The reception stop portion 355 may stop the reception operation by stopping the power supply to the LF reception portion 32 from the battery 31, for example.

The fault detection portion 356 detects a fault in the acceleration sensor unit 34. The fault detection portion 356 detects that the acceleration sensor unit 34 fails under the condition that the change quantity of an acceleration detected by the acceleration detection portion 342 continues to be smaller than or equal to the predetermined threshold value for a predetermined period and a resultant vector from the three axis accelerations detected by the acceleration detection portion 342 exceeds a predetermined range based on gravity acceleration of 1G. When the change quantity of an acceleration detected by the acceleration detection portion 342 continues to be smaller than or equal to the predetermined threshold value for a predetermined period, it can be estimated that the mobile device 3 continues to be motionless or the acceleration sensor unit 34 fails. When the mobile device 3 continues to be motionless in this state, the resultant vector from the three axis accelerations is sure to fall within the predetermined range based on the gravity acceleration of 1G. In this state, it is possible to detect that the acceleration sensor unit 34 fails on condition that the resultant vector from the three axis accelerations exceeds the predetermined range based on the gravity acceleration of 1G.

In one example, when a period in which the information acquisition portion 354 does not acquire a vibration detection signal reaches a predetermined period such as, for example, ten minutes, the fault detection portion 356 allows the information acquisition portion 354 to read three axis accelerations stored in the storage portion 344. The fault detection portion 356 can detect a failure of the acceleration sensor unit 34 when the size of a resultant vector from the read three axis accelerations exceeds a predetermined range of 0.5 G through 1.5 G based on the gravity acceleration of 1G as the center. The predetermined period can be set so that the mobile device 3 can be assumed to be motionless. The predetermined range may be applicable to the size of a resultant vector from three axis accelerations in the motionless state.

When the fault detection portion 356 detects a failure of the acceleration sensor unit 34, the operation change portion 357 prevents the reception stop portion 355 from stopping the reception operation. In other words, the operation change portion 357 prevents the reception stop portion 355 from stopping the reception operation regardless of detection results from the acceleration detection portion 342. Namely, the LF reception portion 32 is allowed to continue the reception operation.

<Fault Detection Process in the Mobile Device 3>

Figure 8:
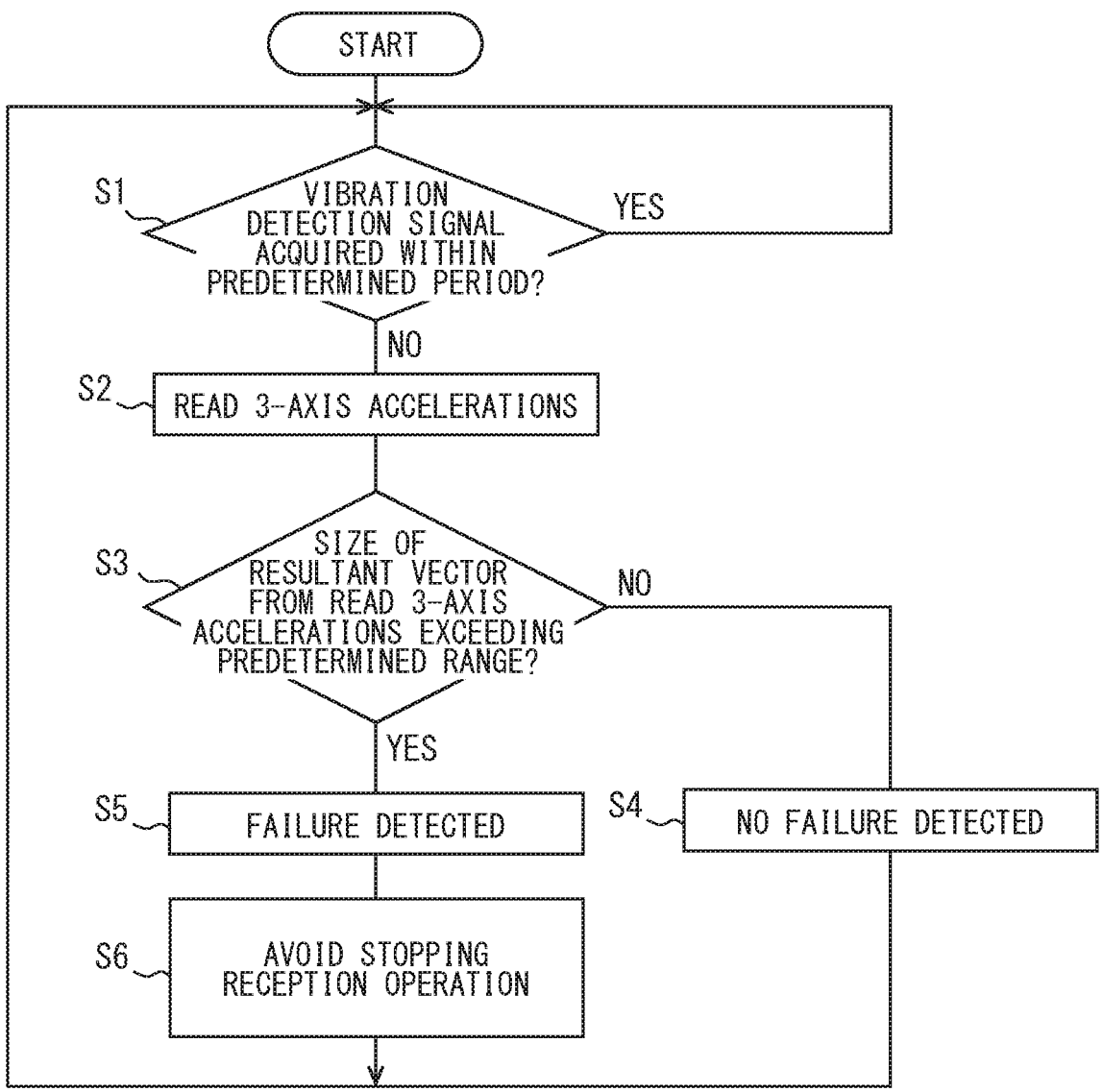
FIG. 8 is a flowchart illustrating one example of a fault detection process on the mobile device.

With reference to a flowchart in FIG. 8, the description below exemplarily shows one example of a process (fault detection process) in the mobile device 3 to detect a failure of the acceleration sensor unit 34. According to the flowchart in FIG. 8, the process starts when the battery 31 starts supplying the power to the mobile device control portion 35 of the mobile device 3. The process ends when the battery stops supplying the power.

In S1, when the period in which the information acquisition portion 354 does not acquire a vibration detection signal reaches the predetermined period, namely, the vibration detection signal is not acquired for the predetermined period or longer (NO in S1), the process proceeds to S2. When a vibration detection signal is acquired within the predetermined period (YES in S1), the process in S1 is repeated on the assumption that no failure is detected. The case where the period in which the information acquisition portion 354 does not acquire a vibration detection signal reaches the predetermined period may be also referred to as a case where this state in which the change quantity of an acceleration detected by the acceleration detection portion 342 continues to be smaller than or equal to a predetermined threshold value continues for the predetermined period.

In S2, the fault detection portion 356 allows the information acquisition portion 354 to read three axis accelerations stored in the storage portion 344. In S3, when the size of a resultant vector from the read three axis accelerations exceeds the predetermined range based on the gravity acceleration of 1G as the center (YES in S3), the process proceeds to S5. When the size does not exceed the predetermined range (NO in S3), the process proceeds to S4.

In S4, the fault detection portion 356 does not detect a failure from the acceleration detection portion 342 and returns to S1 to repeat the process. When no failure is detected, the operation change portion 357 prevents the reception stop portion 355 from stopping the reception operation of the LF reception portion 32. Namely, the reception stop portion 355 is ready to be capable of stopping the reception operation of the LF reception portion 32 depending on detection results from the acceleration detection portion 342.

In S5, the fault detection portion 356 detects that the acceleration sensor unit 34 fails. In S6, the operation change portion 357 prevents the reception stop portion 355 from stopping the reception operation of the LF reception portion 32. Namely, the reception stop portion 355 does not stop the reception operation of the LF reception portion 32 regardless of detection results from the acceleration detection portion 342.

After the process in S6, it is favorable to return to S1 and repeat the process. Then, the fault detection portion 356 continues to detect a failure of the acceleration sensor unit 34 even when the acceleration sensor unit 34 is detected to be faulty. There may be a case where the fault detection portion 356 once detects the acceleration sensor unit 34 to be faulty and later detects no failure in the acceleration sensor unit 34. In such a case, the operation change portion 357 resumes the reception stop portion 355 to be capable of stopping the reception operation of the LF reception portion 32. After the process in S6, it is favorable to return to S1 and repeat the process based on a trigger of the near field wireless communication with the vehicle unit 2.

The MEMS acceleration sensor is likely to temporarily fail to detect acceleration due to temporary contact with a tiny electrode. However, according to the above-described configuration, the operation change portion 357 can resume the reception stop portion 355 to be able to stop the reception operation of the LF reception portion 32 when the MEMS acceleration sensor recovers from a temporary failure in the acceleration detection and is free from failure. It is possible to avoid a trouble that causes the reception stop portion 355 to continue stopping the reception operation of the LF reception portion 32 despite the recovery from the failure.

According to the configuration of the first embodiment, the reception stop portion 355 stops the reception operation of the LF reception portion 32 based on detection results from the acceleration detection portion 342 of the acceleration sensor unit 34 except the case where the user approaches the vehicle and the predetermined period elapses after the user gets on the vehicle. The mobile device is capable of power saving compared to the case of always continuing the reception operation. The operation change portion 357 is provided to prevent the reception stop portion 355 from stopping the reception operation of the LF reception portion 32. When the fault detection portion 356 detects a failure in the acceleration sensor unit 34, it is possible to avoid unnecessarily continuing to stop the reception operation for power saving. It is possible to avoid trouble that disables the code verification although the user approaches the vehicle. As a result, the use of the acceleration sensor unit 34 allows the mobile device 3 to be capable of power saving. Besides, it is possible to avoid unnecessarily continuing the operation for power saving when the acceleration sensor unit 34 fails.

According to the configuration of the first embodiment, the fault detection portion 356 can detect a failure based on detection results from the acceleration detection portion 342. It is possible to reduce the costs of providing additional mechanical configurations to detect failures in the acceleration sensor unit 34.

Second Embodiment

The second embodiment is also available for the fault detection mode of the acceleration sensor unit 34 as described in the first embodiment. The description below shows the configuration of the second embodiment. The authentication system 1 according to the second embodiment is similar to the authentication system 1 according to the first embodiment except that the vehicle unit 2 includes a verification ECU 21a instead of the verification ECU 21 and the mobile device 3 is replaced by a mobile device 3a.

<Schematic Configuration of the Verification ECU 21a>

Figure 9:
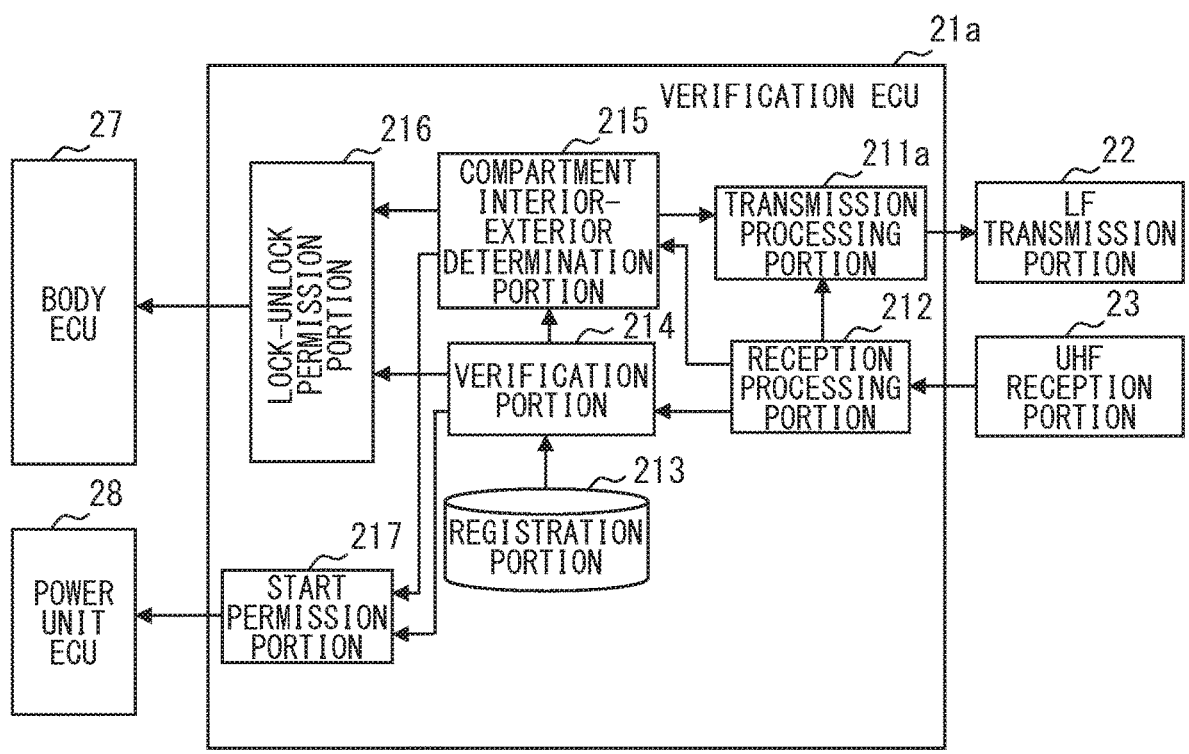
FIG. 9 is a diagram illustrating one example of a schematic configuration of a verification ECU.

With reference to FIG. 9, the description below shows a schematic configuration of the verification ECU 21a. As illustrated in FIG. 9, the verification ECU 21a includes function blocks such as a transmission processing portion 211a, the reception processing portion 212, the registration portion 213, the verification portion 214, the compartment interior-exterior determination portion 215, the lock-unlock permission portion 216, and the start permission portion 217. The verification ECU 21a is similar to the verification ECU 21 according to the first embodiment except that the transmission processing portion 211a is included instead of the transmission processing portion 211. The verification ECU 21a corresponds to an authentication-target-coupled instrument.

Similar to the transmission processing portion 211, the transmission processing portion 211a allows the LF transmission portion 22 to transmit a request signal from the door antennas 24a through 24d, the interior antenna 25, and the trunk exterior antenna 26. The request signal contains the vehicle identification code to identify the vehicle.

After an occupant exits from the vehicle Ve and the doors are locked, the transmission processing portion 211a transmits a burst signal to measure the received signal strength indication (RSSI) in addition to a signal for a fault detection command from the door antennas 24a through 24d and the trunk exterior antenna 26. The burst signal for RSSI measurement is hereinafter simply described as the burst signal. The transmission processing portion 211a can determine that the occupant exits from the vehicle Ve based on results from the body ECU 27 to detect whether the occupant takes a seat and the vehicle door is opened or closed. Whether the door is locked can be determined based on a drive signal output from the body ECU 27 to the door lock motor.

For example, the transmission processing portion 211a successively transmits request signals from the door antennas 24a through 24d, the interior antenna 25, and the trunk exterior antenna 26 after the occupant exits from the vehicle Ve and the doors are locked. The mobile device 3a returns a response signal (see RESPONSE in FIG. 10) in response to the timing when the door antennas 24a through 24d or the trunk exterior antenna 26 transmits the request signal (see EXTERIOR VERIFICATION COMMAND in FIG. 10). The reception processing portion 212 receives the response signal. The lock-unlock permission portion 216 permits the door lock when the verification portion 214 succeeds in the code verification (exterior verification) using a mobile device identification code contained in the response signal. Then, the body ECU 27 performs the door lock when the body ECU 27 detects that the user touches the touch sensor provided for the outer door handle.

The transmission processing portion 211a may successively transmit request signals from the door antennas 24a through 24d, the interior antenna 25, and the trunk exterior antenna 26 based on a trigger that the user touches the touch sensor provided for the outer door handle. In this case, the body ECU 27 can perform the door lock when the verification portion 214 succeeds in the exterior verification.

Figure 10:
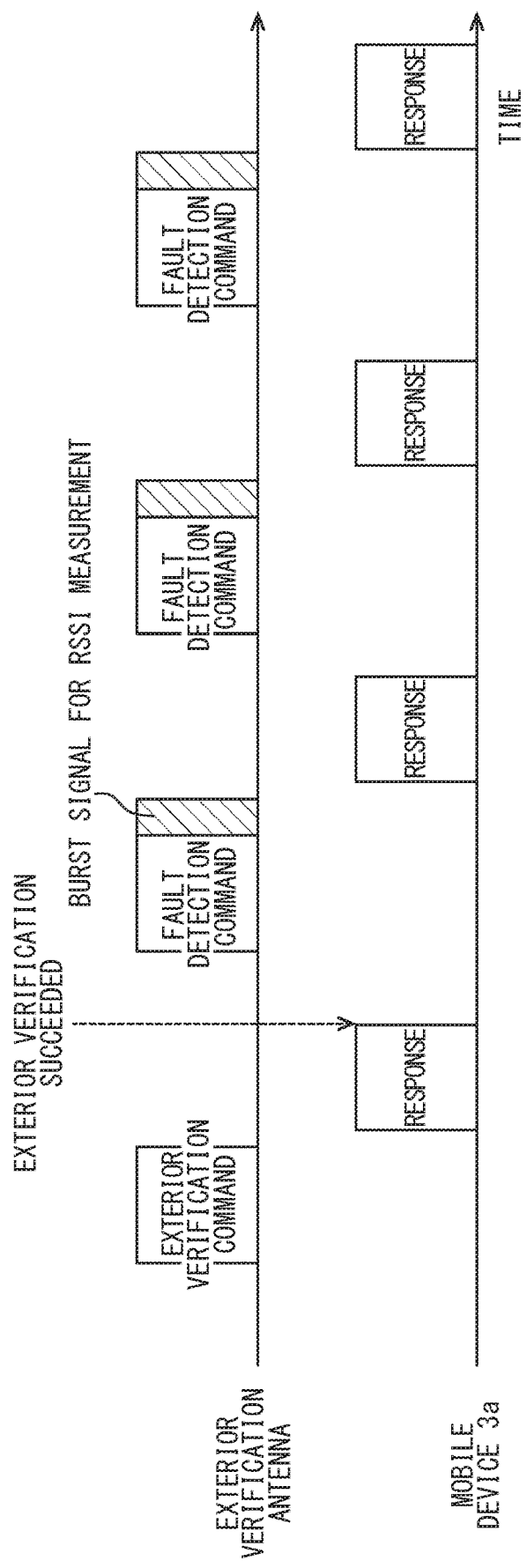
FIG. 10 is a schematic diagram illustrating signals transmitted by a transmission processing portion.

After the door lock, the transmission processing portion 211a periodically transmits the burst signal in addition to the request signal as a fault detection command from the exterior verification antennas such as the door antennas 24a through 24d or the trunk exterior antenna 26 as illustrated in FIG. 10. The transmission processing portion 211a may periodically transmit the fault detection command and the burst signal until the mobile device 3a does not return a response signal corresponding to the fault detection command.

<Schematic Configuration of the Mobile Device 3a>

Figure 11:
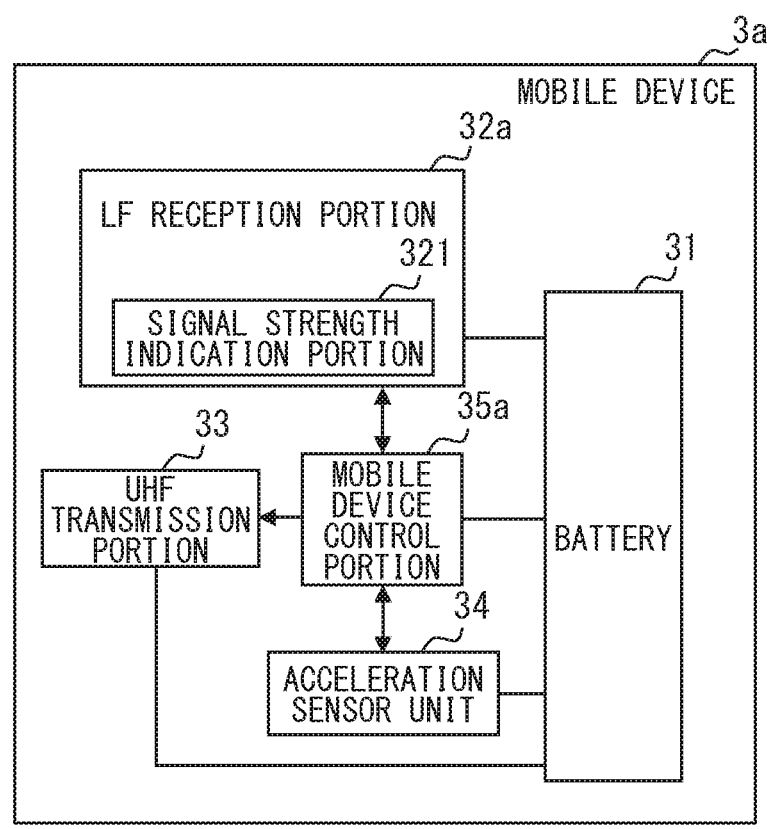
FIG. 11 is a diagram illustrating one example of a schematic configuration of the mobile device.

With reference to FIG. 11, the description below shows the mobile device 3a. As illustrated in FIG. 11, the mobile device 3a includes the battery 31, an LF reception portion 32a, the UHF transmission portion 33, the acceleration sensor unit 34, and a mobile device control portion 35a. The mobile device 3a is similar to the mobile device 3 according to the first embodiment except that the LF reception portion 32a is included instead of the LF reception portion 32 and the mobile device control portion 35a is included instead of the mobile device control portion 35.

The LF reception portion 32a is similar to the LF reception portion 32 according to the first embodiment except that a signal strength indication portion is included. The signal strength indication portion 321 mainly uses an RSSI circuit to indicate RSSI of a signal received by the LF reception portion 32a. The LF reception portion 32 according to the first embodiment may indicate the RSSI. The mobile device control portion 35a is similar to the mobile device control portion 35 according to the first embodiment except some different processes. The mobile device control portion 35a will be described in detail below.

<Schematic Configuration of the Mobile Device Control Portion 35a>

Figure 12:
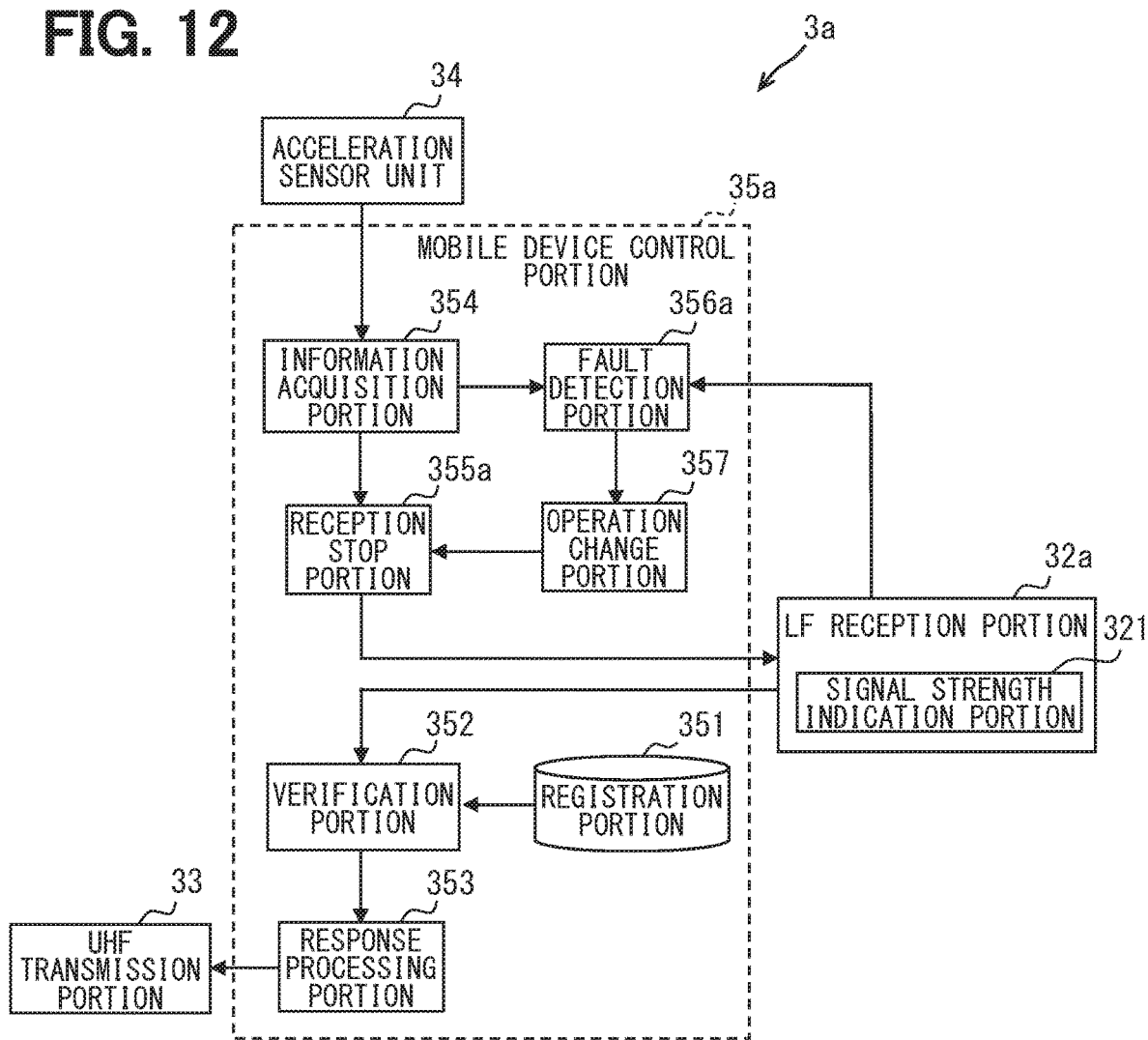
FIG. 12 is a diagram illustrating one example of a schematic configuration of the mobile device control portion.

With reference to FIG. 12, the description below shows a schematic configuration of the mobile device control portion 35a. As illustrated in FIG. 12, the mobile device control portion 35a includes function blocks such as the registration portion 351, the verification portion 352, the response processing portion 353, the information acquisition portion 354, a reception stop portion 355a, a fault detection portion 356a, and the operation change portion 357. The mobile device control portion 35a is similar to the mobile device control portion 35 according to the first embodiment except that the reception stop portion 355a is included instead of the reception stop portion 355 and the fault detection portion 356a is included instead of the fault detection portion 356.

The reception stop portion 355a stops the reception operation of the LF reception portion 32a after a moratorium based on a detection result from the acceleration detection portion 342. The moratorium can be equal to the above-described predetermined period elapsed after the information acquisition portion 354 stops acquiring a vibration detection signal. In other words, the moratorium may be set to a predetermined period elapsed after the change quantity of an acceleration detected by the acceleration detection portion 342 stops exceeding a change quantity threshold value. The change quantity threshold value is used to distinguish the change quantity of an acceleration corresponding to vibration due to the movement of a user carrying the mobile device 3. The change quantity threshold value can be set to any value. The reception stop portion 355a is similar to the reception stop portion 355 according to the first embodiment except that the reception stop portion 355a is sure to complete the moratorium and then stops the reception operation of the LF reception portion 32a based on detection results from the acceleration detection portion 342.

The fault detection portion 356a detects a failure of the acceleration sensor unit 34 by using a method different from that for the fault detection portion 356 according to the first embodiment. Before the above-described moratorium expires, the signal strength indication portion 321 indicates the RSSI of burst signals successively transmitted from the exterior verification antenna after an occupant exits from the vehicle Ve and the doors are locked. When the RSSI goes below a predetermined value, the fault detection portion 356a determines whether there occurred a state in which the change quantity of an acceleration detected by the acceleration detection portion 342 exceeds a change quantity threshold value since the beginning of the burst signal reception after the door lock. The fault detection portion 356a detects that the acceleration sensor unit 34 is faulty when it is determined that the threshold value has not been exceeded. The change quantity threshold value can be set to the above-described predetermined threshold value used to distinguish an estimated acceleration from vibration due to the movement of the user, for example.

Figure 13:
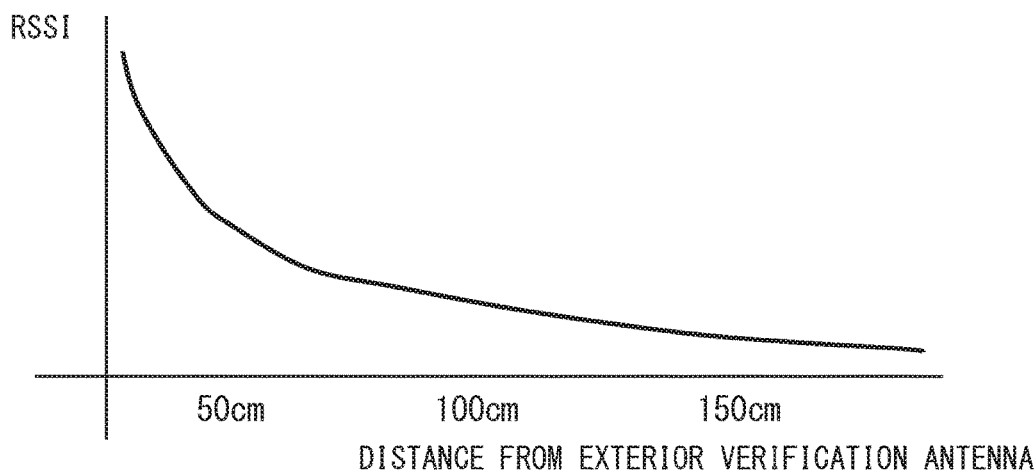
FIG. 13 is a diagram illustrating one example of the relationship between RSSI and a distance of the mobile device from an exterior verification antenna.

As illustrated in FIG. 13, the RSSI, at the mobile device 3a, of a signal transmitted from the exterior verification antenna decreases as the mobile device 3a is distant from the exterior verification antenna. A certain period until the RSSI of the burst signal goes below the predetermined value since the mobile device 3a starts receiving the burst signal after the door lock corresponds to a period until the user carrying the mobile device 3a exits from the vehicle and moves to a position at a predetermined distance from the vehicle Ve. In a situation where the user carrying the mobile device 3a moves, the acceleration detection portion 342 is sure to detect an acceleration change quantity larger than or equal to the above-described threshold value when no failure occurs. The fault detection portion 356a detects the failure in the acceleration sensor unit 34 when the user carrying the mobile device 3a moves and the acceleration detection portion 342 does not detect the acceleration change quantity larger than or equal to the above-described threshold value. It is possible to more accurately detect the failure in the acceleration sensor unit 34.

In one example, the fault detection portion 356a executes a process described below before the above-described moratorium is exceeded. The exterior verification antenna successively transmits burst signals after the occupant exits from the vehicle Ve and locks the door. The signal strength indication portion 321 indicates the received signal strength of burst signals. The fault detection portion 356a determines whether the received signal strength of a burst signal goes below a predetermined value. The predetermined value can be set to be capable of estimating the user carrying the mobile device 3a to move from the vehicle Ve to a distant position. The predetermined value can be set to any value.

When it is determined that the received signal strength of the burst signal goes below the predetermined value, the fault detection portion 356a allows the information acquisition portion 354 to acquire the vibration detection history from the beginning of the burst signal reception after the door lock to the present. The fault detection portion 356a detects the acceleration sensor unit 34 to be not faulty when the vibration is detected in the vibration detection history acquired by the information acquisition portion 354. The fault detection portion 356a detects the acceleration sensor unit 34 to be faulty when no vibration is detected.

<Fault Detection Process on the Mobile Device 3a>

Figure 14:
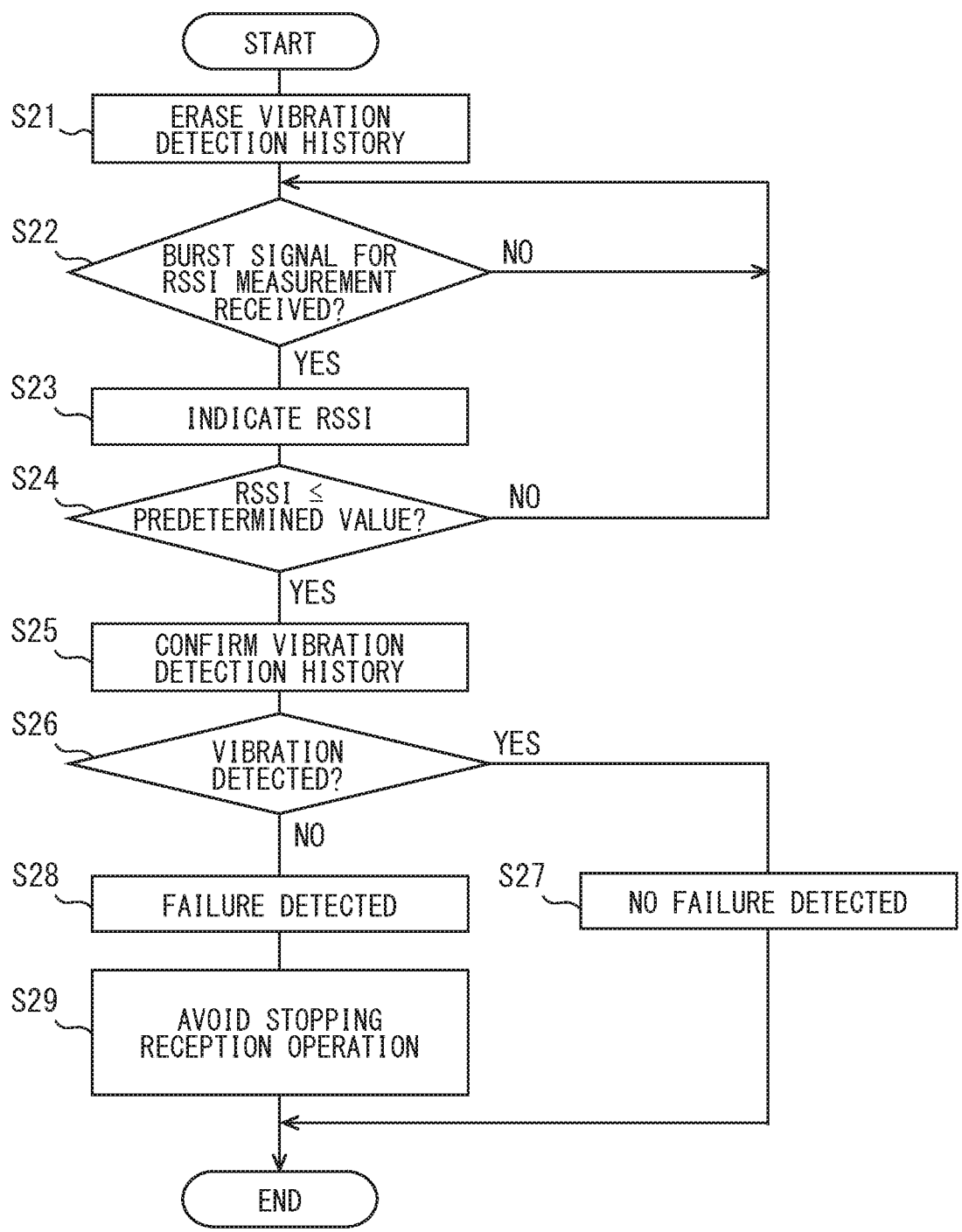
FIG. 14 is a flowchart illustrating one example of a fault detection process on the mobile device.

With reference to a flowchart in FIG. 14, the description below exemplarily shows the fault detection process in the mobile device 3a. The flowchart in FIG. 14 is assumed to start after the occupant exits from the vehicle Ve and locks the door. For example, the mobile device 3a can identify that the occupant exits from the vehicle Ve and locks the door based on the start of receiving the fault detection command whose transmission starts after the exterior verification succeeds.

In S21, the sensor control portion 343 erases the vibration detection history stored in the storage portion 344. This is because the storage portion 344 needs to store only the detection history from the start of receiving burst signals after the occupant exits from the vehicle Ve and locks the door. In S22, the LF reception portion 32a may receive a burst signal following the fault detection command (YES in S22). In this case, the process proceeds to S23. The LF reception portion 32a may not receive the burst signal (NO in S22). In this case, the process in S22 is repeated.

In S23, the signal strength indication portion 321 indicates the RSSI of the burst signal received in S22. In S24, when the RSSI indicated in S23 is smaller than or equal to the above-described predetermined value (YES in S24), the process proceeds to S25. When the RSSI is not smaller than or equal to the predetermined value (NO in S24). In this case, the process returns to S22 and is repeated.

In S25, the sensor control portion 343 reads the vibration detection history stored in the storage portion 344 and outputs the vibration detection history to the mobile device control portion 35a. The information acquisition portion 354 acquires this vibration detection history. The fault detection portion 356a confirms this vibration detection history. This vibration detection history applies to the period from the time to start receiving burst signals after the occupant exits from the vehicle Ve and locks the door, to the time when the RSSI of the burst signal goes smaller than or equal to the predetermined value.

In S26, the vibration may not be detected (NO in S26) after the fault detection portion 356a confirms the vibration detection history in S25. In this case, the process proceeds to S28. However, the process proceeds to S27 when the vibration is detected (YES in S26).

In S27, the fault detection portion 356a detects no failure in the acceleration sensor unit 34. Then, the fault detection process ends. In S28, the fault detection portion 356a detects that the acceleration sensor unit 34 is faulty. In S29, the operation change portion 357 prevents the reception stop portion 355a from stopping the reception operation of the LF reception portion 32a, namely, allows the LF reception portion 32a to continue the reception operation. Then, the fault detection process ends.

The fault detection process on the mobile device 3a may return to S22 and repeat after S29 until the above-described moratorium expires. The fault detection portion 356a may continue detecting the failure in the acceleration sensor unit 34 even when the acceleration sensor unit 34 is detected to be faulty. There may be a case where the fault detection portion 356a once detects the failure in the acceleration sensor unit 34 and later does not detect the failure in the acceleration sensor unit 34. In such a case, the operation change portion 357 may resume the reception stop portion 355a to be able to stop the reception operation of the LF reception portion 32a.

The configuration of the second embodiment is similar to the configuration of the first embodiment except that the acceleration sensor unit 34 uses the different fault detection mode. The configuration of the second embodiment also allows the mobile device 3a to be capable of power saving by using the acceleration sensor unit 34. It is possible to avoid unnecessarily continuing the operation for power saving when the acceleration sensor unit 34 fails. Besides, the configuration of the second embodiment can also allow the fault detection portion 356a to detect the failure based on detection results from the acceleration detection portion 342. It is possible to reduce the costs of providing additional mechanical configurations to detect failures in the acceleration sensor unit 34.

According to the configuration of the second embodiment, there may be the case where the user carrying the mobile device 3a is sure to move and the acceleration detection portion 342 does not detect the acceleration change quantity larger than or equal to the above-described threshold value. In such a case, the acceleration sensor unit 34 is detected to be faulty. It is possible to more accurately detect the failure in the acceleration sensor unit 34.

Third Embodiment

The third embodiment is also available for the fault detection mode of the acceleration sensor unit 34 as described in the first and second embodiments. The description below shows the configuration of the third embodiment. The authentication system 1 according to the third embodiment is similar to the authentication system 1 according to the first embodiment except that the vehicle unit 2 includes a verification ECU 21b instead of the verification ECU 21 and a mobile device 3b is included instead of the mobile device 3.

<Schematic Configuration of the Verification ECU 21b>

Figure 15:
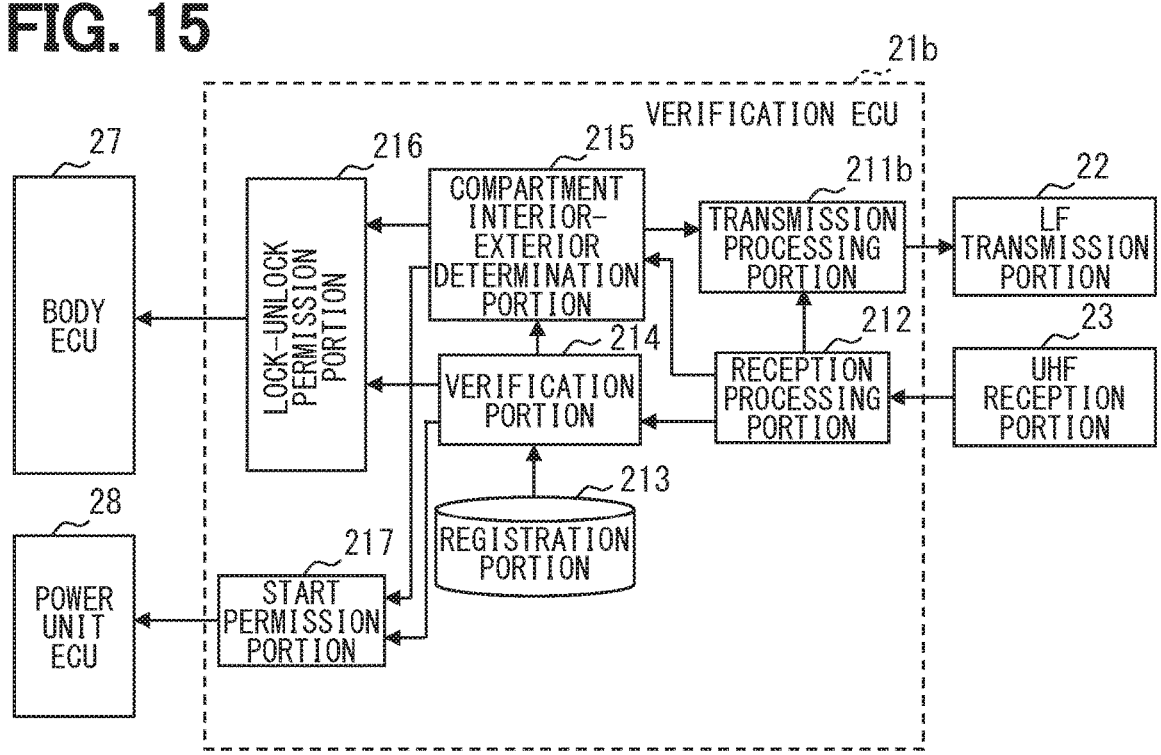
FIG. 15 is a diagram illustrating one example of a schematic configuration of the verification ECU.

With reference to FIG. 15, the description below shows a schematic configuration of the verification ECU 21b. As illustrated in FIG. 15, the verification ECU 21b includes function blocks such as a transmission processing portion 211b, the reception processing portion 212, the registration portion 213, the verification portion 214, the compartment interior-exterior determination portion 215, the lock-unlock permission portion 216, and the start permission portion 217. The verification ECU 21b is similar to the verification ECU 21 according to the first embodiment except that the transmission processing portion 211b is included instead of the transmission processing portion 211. The verification ECU 21b corresponds to an authentication-target-coupled instrument.

Similar to the transmission processing portion 211, the transmission processing portion 211b allows the LF transmission portion 22 to transmit a request signal from the door antennas 24a through 24d, the interior antenna 25, and the trunk exterior antenna 26. The request signal contains the vehicle identification code to identify the vehicle.

The transmission processing portion 211b transmits an exterior verification command as a request signal from the door antennas 24a through 24d and the trunk exterior antenna 26 and an interior verification command as a request signal from the interior antenna 25 so that the mobile device 3b can distinguish these commands. For example, the transmission can contain information to distinguish between the exterior verification command and the interior verification command. In the description below, the door antennas 24a through 24d and the trunk exterior antenna 26 are denoted as exterior verification antennas, and the interior antenna 25 is denoted as an interior verification antenna.

In one example, as described in the second embodiment, the transmission processing portion 211b periodically transmits the exterior verification command from the exterior verification antenna after the occupant exits from the vehicle Ve and locks the door. When the exterior verification succeeds, the lock-unlock permission portion 216 permits the door lock. The body ECU 27 performs the door lock when detecting that the user touches the touch sensor provided for the outer door handle. The transmission processing portion 211b may transmit the exterior verification command from the exterior verification antenna based on a trigger that the user touches the touch sensor provided for the outer door handle. When the exterior verification succeeds, the body ECU 27 may perform the door lock.

After the occupant exits from the vehicle Ve and locks the door, the transmission processing portion 211b may transmit the interior verification command from the interior verification antenna to detect that the mobile device 3b is left inside the vehicle compartment of the vehicle Ve. In this case, the reception processing portion 212 receives a response signal returned from the mobile device 3b in response to the interior verification command. The lock-unlock permission portion 216 may not permit the door lock so that the door is not locked when the verification portion 214 succeeds in the code verification (interior verification) by using the mobile device identification code contained in the response signal.

When the door is opened or closed after the door is unlocked, the transmission processing portion 211b periodically transmits the interior verification command from the interior verification antenna. When the interior verification succeeds, the start permission portion 217 transmits a start permission signal for the travel drive source to the power unit ECU 28 so that the travel drive source is ready to start. The transmission processing portion 211b can determine the door unlock based on the output of a drive signal from the body ECU 27 to the door lock motor. The transmission processing portion 211b can determine the door opening/closing based on a signal from the courtesy switch. The transmission processing portion 211b may transmit the interior verification command from the interior verification antenna based on a trigger that the user manipulates the start switch to start the travel drive source. When the interior verification succeeds, the transmission processing portion 211b may transmit the start permission signal for the travel drive source to the power unit ECU 28.

Figure 16:
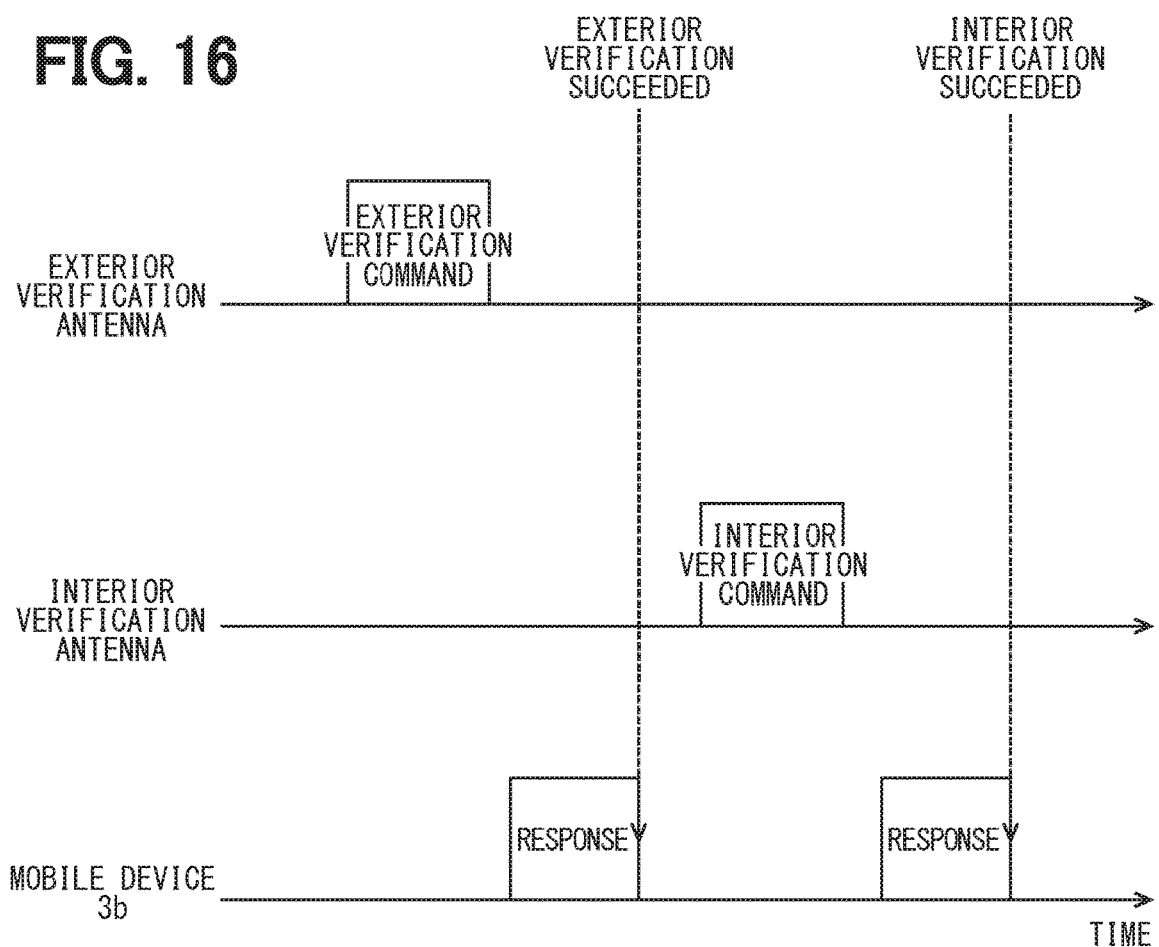
FIG. 16 is a schematic diagram illustrating signals transmitted by a transmission processing portion.

In the authentication system 1 according to the third embodiment, the user carrying the mobile device 3b may move to approach the vehicle Ve and may get on vehicle Ve. In such a case, as illustrated in FIG. 16, the exterior verification antenna transmits an exterior verification command to perform the exterior verification. When the exterior verification succeeds to unlock the door of the vehicle Ve and then the user gets on the vehicle Ve and attempts to start the travel drive source of the vehicle Ve, as illustrated in FIG. 16, the interior verification antenna transmits the interior verification command to perform the interior verification.

When the interior verification succeeds to start the travel drive source of the vehicle Ve, the vehicle Ve stops traveling, and the user exits from the vehicle Ve, the exterior verification antenna transmits an exterior verification command to perform the exterior verification. Besides, the interior verification antenna transmits the interior verification command to perform the interior verification. The exterior verification transitions to the interior verification when the user carrying the mobile device 3b gets on the vehicle Ve. The interior verification transitions to the exterior verification when the user carrying the mobile device 3b exits from the vehicle Ve.

<Schematic Configuration of the Mobile Device 3b>

The mobile device 3b will be described. The mobile device 3b includes the battery 31, the LF reception portion 32, the UHF transmission portion 33, the acceleration sensor unit 34, and a mobile device control portion 35b. the mobile device 3b is similar to the mobile device 3 according to the first embodiment except that the mobile device control portion 35b is included instead of the mobile device control portion 35. The mobile device control portion 35b is similar to the mobile device control portion 35 according to the first embodiment except some different processes. The mobile device control portion 35b will be described in detail below.

<Schematic Configuration of the Mobile Device Control Portion 35b>

Figure 17:
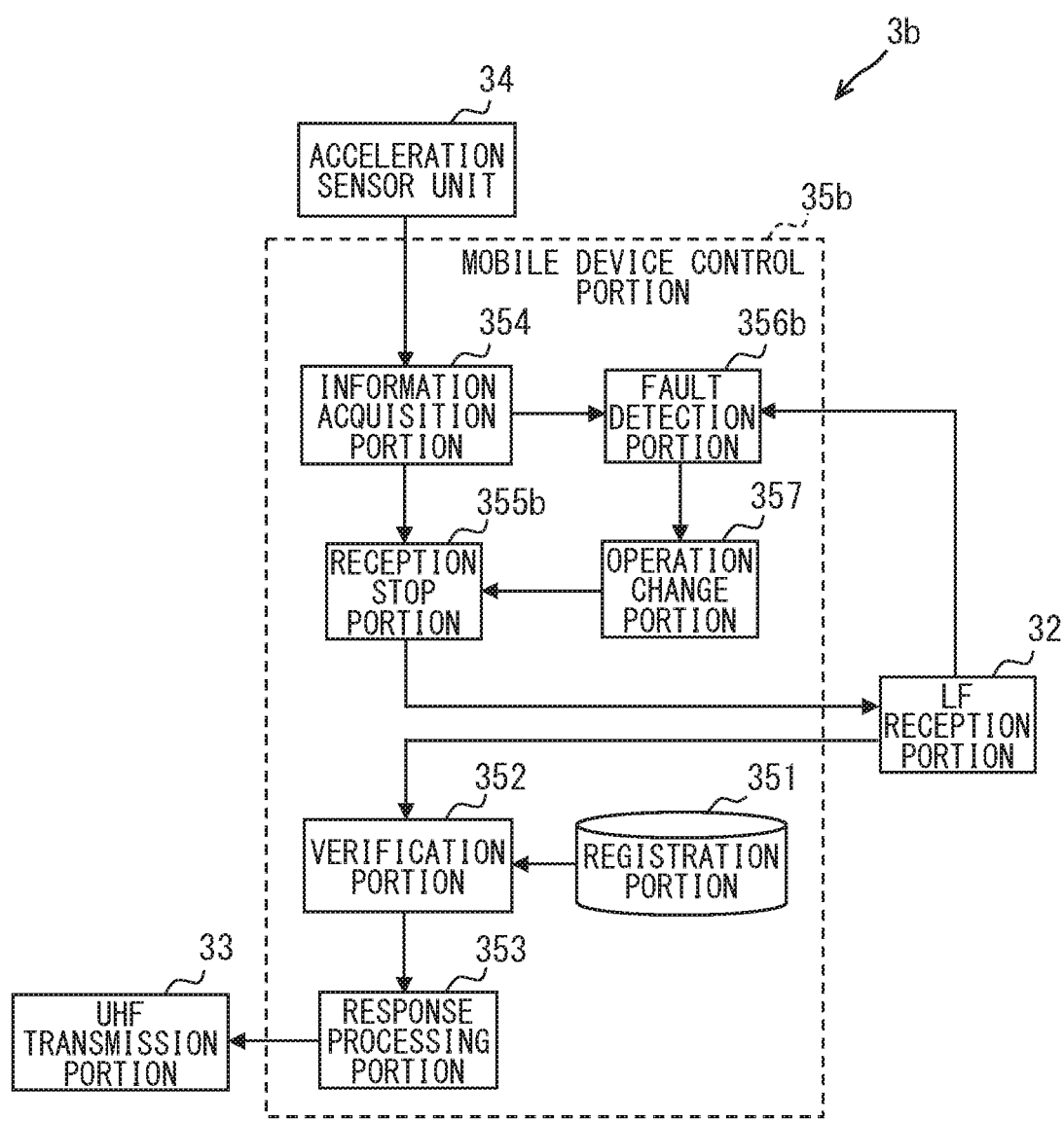
FIG. 17 is a diagram illustrating one example of a schematic configuration of the mobile device control portion.

With reference to FIG. 17, the description below shows a schematic configuration of the mobile device control portion 35b. As illustrated in FIG. 17, the mobile device control portion 35b includes function blocks such as the registration portion 351, the verification portion 352, the response processing portion 353, the information acquisition portion 354, a reception stop portion 355b, a fault detection portion 356b, and the operation change portion 357. The mobile device control portion 35b is similar to the mobile device control portion 35 according to the first embodiment except that the reception stop portion 355b is included instead of the reception stop portion 355 and the fault detection portion 356b is included instead of the fault detection portion 356.

Similar to the reception stop portion 355a according to the second embodiment, the reception stop portion 355b stops the reception operation of the LF reception portion 32 after a moratorium based on a detection result from the acceleration detection portion 342. The reception stop portion 355b is similar to the reception stop portion 355 according to the first embodiment except that the reception stop portion 355b is sure to complete the moratorium and then stops the reception operation of the LF reception portion 32 based on detection results from the acceleration detection portion 342.

The fault detection portion 356b detects a failure of the acceleration sensor unit 34 by using a method different from that for the fault detection portion 356 according to the first embodiment. The fault detection portion 356b determines whether there occurred a state in which the change quantity of an acceleration detected by the acceleration detection portion 342 exceeds a change quantity threshold value since an exterior verification, when an interior verification is performed after the exterior verification before the above-described moratorium is exceeded. The fault detection portion 356b detects that the acceleration sensor unit 34 is faulty when it is determined that the threshold value has not been exceeded. The change quantity threshold value may be set to the above-described predetermined threshold value used to distinguish an estimated acceleration from vibration due to the movement of the user, for example.

When the interior verification is performed after the exterior verification, this situation signifies that the user carrying the mobile device 3b moves to get on the vehicle Ve. When the user carrying the mobile device 3b moves, the acceleration detection portion 342 is sure to detect the acceleration change quantity larger than or equal to the above-described threshold value in a case where no failure occurs. The fault detection portion 356b detects the failure in the acceleration sensor unit 34 when the user carrying the mobile device 3b moves and the acceleration detection portion 342 does not detect the acceleration change quantity larger than or equal to the above-described threshold value. It is possible to more accurately detect the failure in the acceleration sensor unit 34.

For example, the fault detection portion 356b performs a process described below before the above-described moratorium is exceeded. The fault detection portion 356b allows the information acquisition portion 354 to acquire the vibration detection history in which the LF reception portion 32 receives an exterior verification command and then receives the interior verification command. The fault detection portion 356b assumes that the acceleration sensor unit 34 is not faulty when the vibration is detected in the vibration detection history acquired by the information acquisition portion 354. The fault detection portion 356b assumes that the acceleration sensor unit 34 is faulty when no vibration is detected.

Besides, the fault detection portion 356b may determine whether there occurred a state in which the change quantity of an acceleration detected by the acceleration detection portion 342 exceeds a change quantity threshold value since an interior verification and an exterior verification when the exterior verification is performed after the interior verification before the above-described moratorium is exceeded. The fault detection portion 356b may detect that the acceleration sensor unit 34 is faulty when it is determined that the threshold value has not been exceeded. The change quantity threshold value can correspond to the above-described predetermined threshold value used to distinguish an estimated acceleration from vibration due to the movement of the user, for example.

When the exterior verification is performed after the interior verification, this situation signifies that the user carrying the mobile device 3b exits from the vehicle Ve. When the user carrying the mobile device 3b moves, the acceleration detection portion 342 is sure to detect the acceleration change quantity larger than or equal to the above-described threshold value when no failure occurs. The fault detection portion 356b detects the failure in the acceleration sensor unit 34 when the user carrying the mobile device 3b moves and the acceleration detection portion 342 does not detect the acceleration change quantity larger than or equal to the above-described threshold value. It is possible to more accurately detect the failure in the acceleration sensor unit 34.

In one example, the fault detection portion 356b may include a configuration of performing a process described below before the above-described moratorium is exceeded. The fault detection portion 356b allows the information acquisition portion 354 to acquire the vibration detection history in which the LF reception portion 32 receives the interior verification command and then receives an exterior verification command. The fault detection portion 356b assumes that the acceleration sensor unit 34 is not faulty when the vibration is detected in the vibration detection history acquired by the information acquisition portion 354. The fault detection portion 356b assumes that the acceleration sensor unit 34 is faulty when no vibration is detected.

<Fault Detection Process on the Mobile Device 3b>

Figure 18:
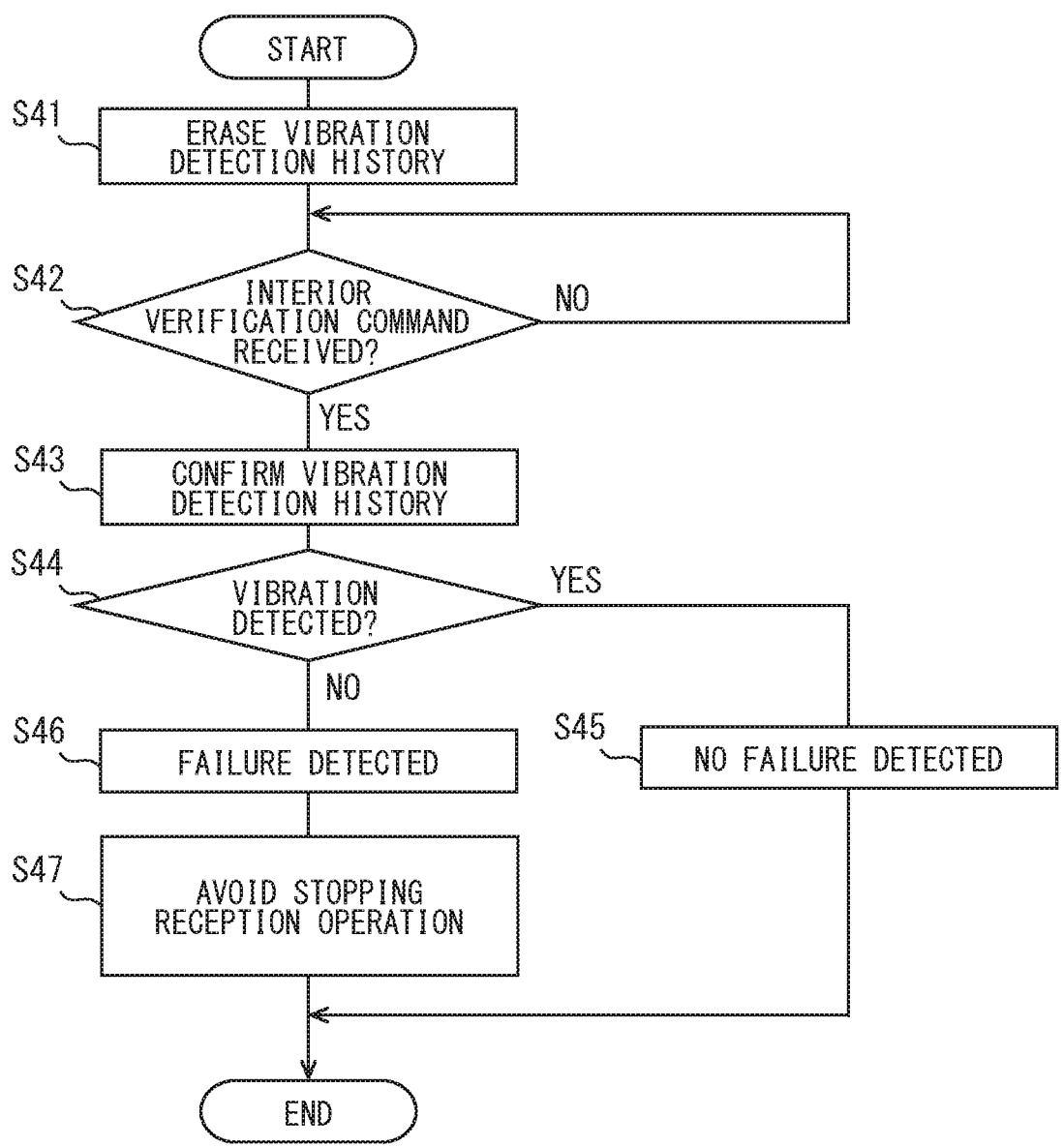
FIG. 18 is a flowchart illustrating one example of a fault detection process on the mobile device.

With reference to flowcharts in FIGS. 18 and 19, the description below exemplarily shows the fault detection process in the mobile device 3b. Using the flowchart in FIG. 18, the description below exemplarily shows the fault detection process when the interior verification is performed after the exterior verification. The flowchart in FIG. 18 is assumed to start when the LF reception portion 32 receives an exterior verification command.

In S41, the sensor control portion 343 erases the vibration detection history stored in the storage portion 344. This is because the storage portion 344 needs to store only the detection history after the exterior verification. In S42, when the LF reception portion 32 may receive the interior verification command (YES in S42), the process proceeds to S43. When the LF reception portion 32 may not receive the interior verification command (NO in S42), the process in S42 is repeated.

In S43, the sensor control portion 343 reads the vibration detection history stored in the storage portion 344 and outputs the vibration detection history to the mobile device control portion 35b. The information acquisition portion 354 acquires this vibration detection history. The fault detection portion 356b confirms this vibration detection history. This vibration detection history applies to the period from the time to perform the exterior verification to the time to perform the interior verification.

In S44, the vibration may not be detected (NO in S44) after the fault detection portion 356b confirms the vibration detection history in S43. In this case, the process proceeds to S46. However, the process proceeds to S45 when the vibration is detected (YES in S44).

In S45, the fault detection portion 356b detects no failure in the acceleration sensor unit 34. Then, the fault detection process ends. In S46, the fault detection portion 356b detects that the acceleration sensor unit 34 is faulty. In S47, the operation change portion 357 prevents the reception stop portion 355b from stopping the reception operation of the LF reception portion 32. Then, the fault detection process ends.

When the interior verification is performed after the exterior verification, the fault detection process may return to S42 after S47 and repeat until the above-described moratorium expires. Namely, the fault detection portion 356b may continue detecting the failure in the acceleration sensor unit 34 even after detecting that the acceleration sensor unit 34 is faulty. There may be a case where the fault detection portion 356b once detects the failure in the acceleration sensor unit 34 and later does not detect the failure in the acceleration sensor unit 34. In such a case, the operation change portion 357 may resume the reception stop portion 355b to be able to stop the reception operation of the LF reception portion 32.

Using the flowchart in FIG. 19, the description below exemplarily shows the fault detection process when the exterior verification is performed after the interior verification. The flowchart in FIG. 19 is assumed to start when the LF reception portion 32 receives the interior verification command.

In S61, the sensor control portion 343 erases the vibration detection history stored in the storage portion 344. This is because the storage portion 344 needs to store only the detection history after the interior verification. In S62, when the LF reception portion 32 receives the exterior verification command (YES in S62), the process proceeds to S63. When the LF reception portion 32 does not receive the exterior verification command (NO in S62), the process in S62 is repeated.

In S63, the sensor control portion 343 reads the vibration detection history stored in the storage portion 344 and outputs the vibration detection history to the mobile device control portion 35b. The information acquisition portion 354 acquires this vibration detection history. The fault detection portion 356b confirms this vibration detection history. This vibration detection history applies to the period from the time to perform the interior verification to the time to perform the exterior verification.

In S64, the vibration may not be detected (NO in S64) after the fault detection portion 356b confirms the vibration detection history in S63. In this case, the process proceeds to S66. However, the process proceeds to S65 when the vibration is detected (YES in S64).

In S65, the fault detection portion 356b detects no failure in the acceleration sensor unit 34. Then, the fault detection process ends. In S66, the fault detection portion 356b detects that the acceleration sensor unit 34 is faulty. In S67, the operation change portion 357 prevents the reception stop portion 355b from stopping the reception operation of the LF reception portion 32. Then, the fault detection process ends.

When the exterior verification is performed after the interior verification, the fault detection process may return to S62 after S67 and repeat until the above-described moratorium expires. Namely, the fault detection portion 356b may continue detecting the failure in the acceleration sensor unit 34 even after detecting that the acceleration sensor unit 34 is faulty. There may be a case where the fault detection portion 356b once detects the failure in the acceleration sensor unit 34 and later does not detect the failure in the acceleration sensor unit 34. In such a case, the operation change portion 357 may resume the reception stop portion 355b to be able to stop the reception operation of the LF reception portion 32.

Figure 19:
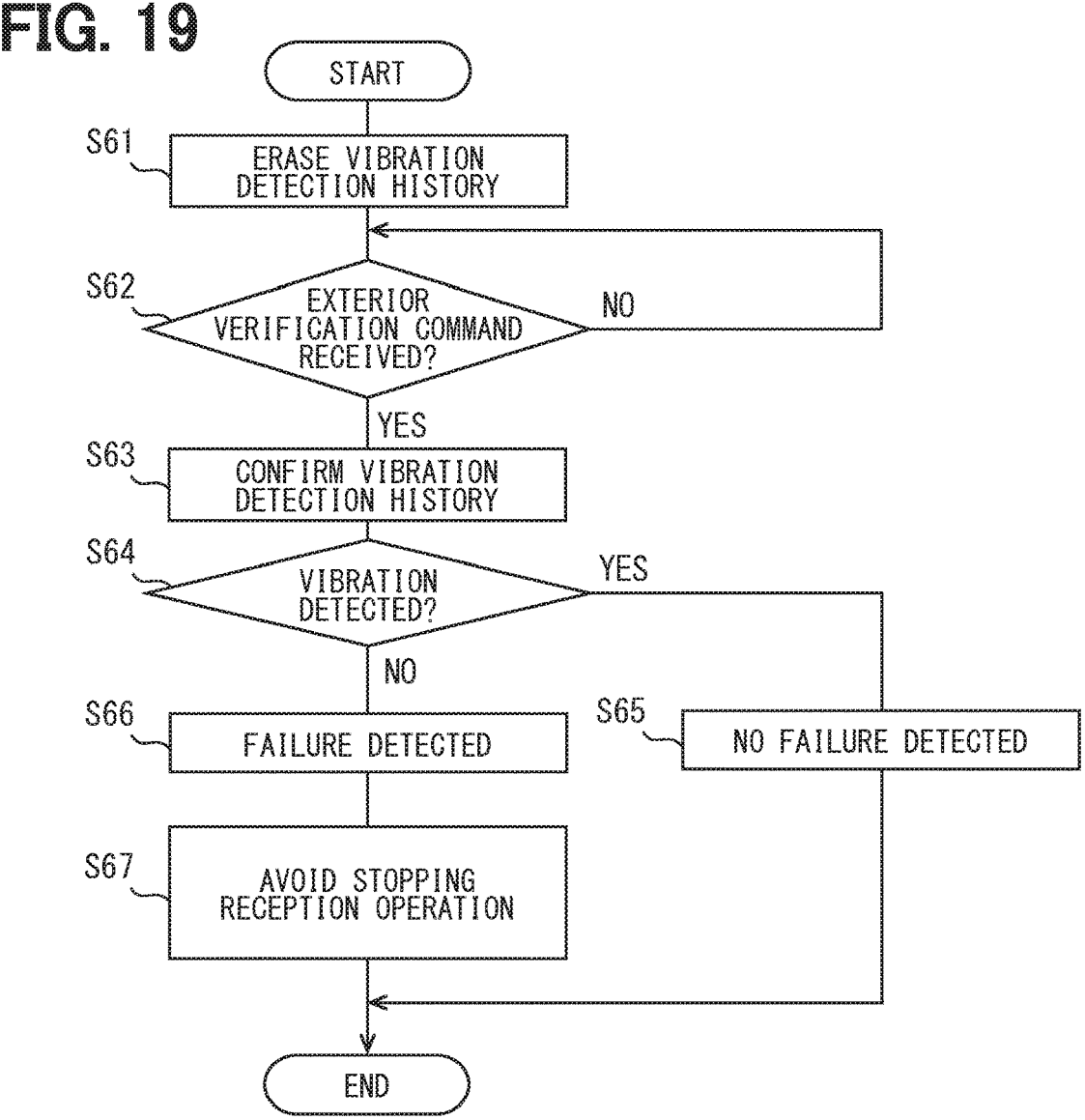
FIG. 19 is a flowchart illustrating one example of a fault detection process on the mobile device.

The mobile device 3b may perform either or both of the processes illustrated by the flowcharts in FIGS. 18 and 19. When both of the processes illustrated by the flowcharts in FIGS. 18 and 19 are performed, it is advisable to start the process in S61 of the flowchart in FIG. 19 after the flowchart in FIG. 18 ends, for example. Besides, it may be favorable to perform the process according to the flowchart in FIG. 19 after the process in S45 of the flowchart in FIG. 18 and avoid performing the process according to the flowchart in FIG. 19 after the process in S47 of the flowchart in FIG. 18.

The configuration of the third embodiment is similar to the configuration of the first embodiment except that the acceleration sensor unit 34 uses the different fault detection mode. The configuration of the third embodiment also allows the mobile device 3b to be capable of power saving by using the acceleration sensor unit 34. It is possible to avoid unnecessarily continuing the operation for power saving when the acceleration sensor unit 34 fails. Besides, the configuration of the third embodiment can also allow the fault detection portion 356b to detect the failure based on detection results from the acceleration detection portion 342. It is possible to reduce the costs of providing additional mechanical configurations to detect failures in the acceleration detection portion 342.

According to the configuration of the third embodiment, there may be the case where the user carrying the mobile device 3a is sure to move and the acceleration detection portion 342 does not detect the acceleration change quantity larger than or equal to the above-described threshold value. In such a case, the acceleration sensor unit 34 is detected to be faulty. It is possible to more accurately detect the failure in the acceleration sensor unit 34.

Fourth Embodiment

The fourth embodiment is also available for the fault detection mode of the acceleration sensor unit 34 as described in the first through third embodiments. The description below shows the configuration of the fourth embodiment. The authentication system 1 according to the fourth embodiment is similar to the authentication system 1 according to the first embodiment except that a mobile device 3c is included instead of the mobile device 3.

<Schematic Configuration of the Mobile Device 3c>

The mobile device 3c will be described. The mobile device 3c includes the battery 31, the LF reception portion 32, the UHF transmission portion 33, an acceleration sensor unit 34c, and a mobile device control portion 35c. The mobile device 3c is similar to the mobile device 3 according to the first embodiment except that the acceleration sensor unit 34c is included instead of the acceleration sensor unit 34 and the mobile device control portion 35c is included instead of the mobile device control portion 35. The mobile device control portion 35c is similar to the mobile device control portion 35 according to the first embodiment except some different processes. The mobile device control portion 35c will be described in detail later.

<Schematic Configuration of the Acceleration Sensor Unit 34c>

Figure 20:
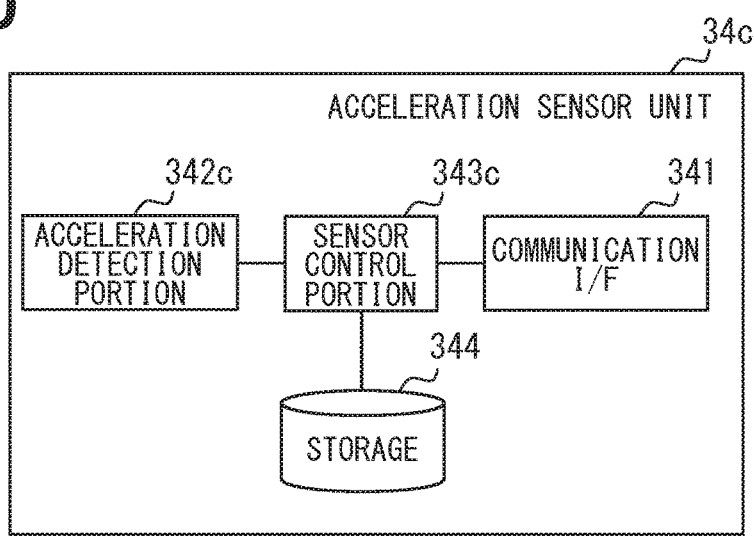
FIG. 20 is a diagram illustrating one example of a schematic configuration of the acceleration sensor unit.

With reference to FIG. 20, the description below shows a schematic configuration of the acceleration sensor unit 34c. As illustrated in FIG. 20, the acceleration sensor unit 34c includes the communication I/F 341, an acceleration detection portion 342c, a sensor control portion 343c, and the storage portion 344. The acceleration sensor unit 34c is similar to the acceleration sensor unit 34 according to the first embodiment except that the acceleration detection portion 342c is included instead of the acceleration detection portion 342 and the sensor control portion 343c is included instead of the sensor control portion 343. The acceleration sensor unit 34c corresponds to an acceleration sensor.

Similar to the acceleration detection portion 342 according to the first embodiment, the acceleration detection portion 342c is available as a capacitance type MEMS acceleration sensor that detects an acceleration based on a change in the capacitance between electrodes. The acceleration detection portion 342c is capable of a self-test to confirm operations by forcibly applying the voltage. For example, the voltage is applied to facing electrodes of the acceleration detection portion 342c to generate an attractive force or a repulsive force between the electrodes. It is just necessary to be able to detect the presence or absence of a failure based on a change in the electrostatic capacitance. The sensor control portion 343c is similar to the sensor control portion 343 according to the first embodiment except that the above-described self-test is conducted on the acceleration detection portion 342c.

<Schematic Configuration of the Mobile Device Control Portion 35c>

Figure 21:
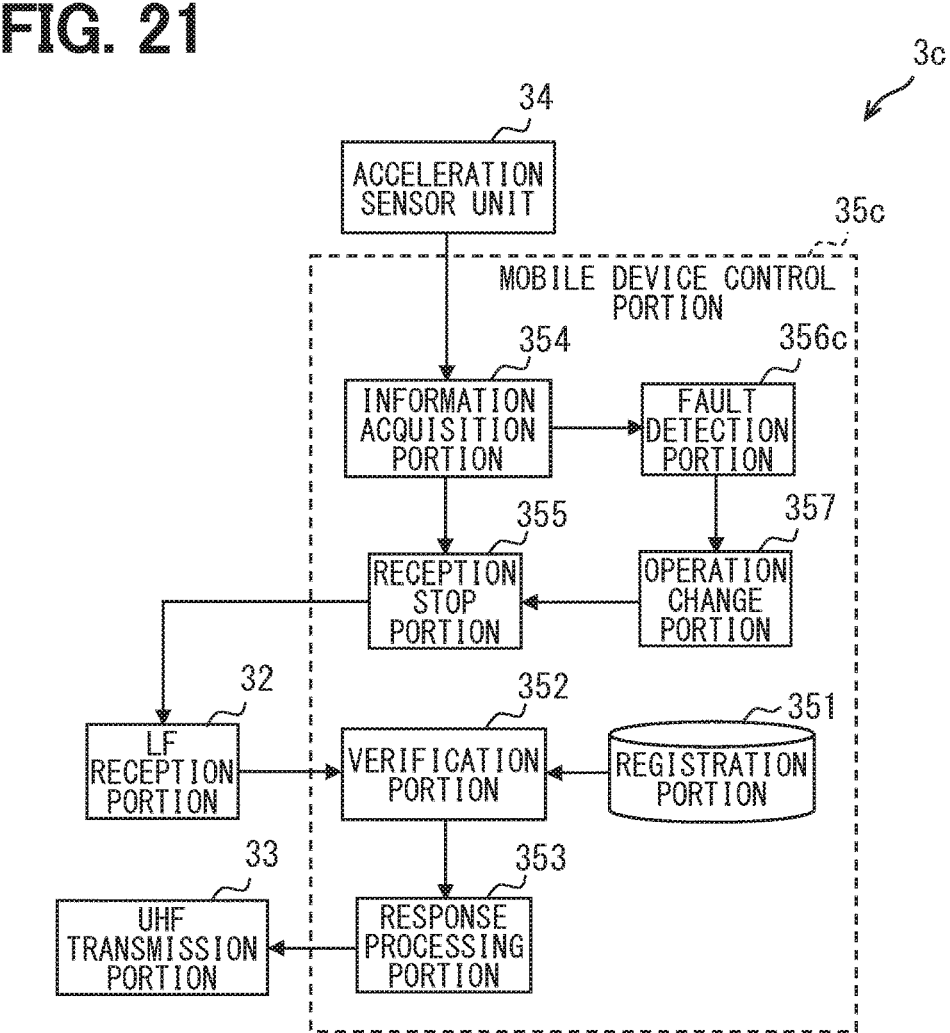
FIG. 21 is a diagram illustrating one example of a schematic configuration of the mobile device control portion.

With reference to FIG. 21, the description below shows a schematic configuration of the mobile device control portion 35c. As illustrated in FIG. 20, the mobile device control portion 35c includes function blocks such as the registration portion 351, the verification portion 352, the response processing portion 353, the information acquisition portion 354, the reception stop portion 355, a fault detection portion 356c, and the operation change portion 357. The mobile device control portion 35c is similar to the mobile device control portion 35 according to the first embodiment except that the fault detection portion 356c is included instead of the fault detection portion 356.

The fault detection portion 356c detects a failure of the acceleration sensor unit 34c by using a method different from that for the fault detection portion 356 according to the first embodiment. The fault detection portion 356c performs the above-described self-test to detect the failure in the acceleration sensor unit 34c. The fault detection portion 356c may successively transmit a directive to the sensor control portion 343c to perform the self-test and acquire a result of the self-test to detect the failure. Alternatively, the sensor control portion 343c may successively perform the self-test without using directives from the fault detection portion 356c. The fault detection portion 356c may successively acquire the results of the self-test to detect a failure. It is necessary to prevent the self-test from increasing the amount of consumption current. For this purpose, it is favorable to perform the self-test after a predetermined lapse of time from the time to stop acquiring the vibration detection signal in the information acquisition portion 354 immediately before allowing the reception stop portion 355 to stop the reception operation and then detect a failure.

The fault detection portion 356c may continue detecting the failure in the acceleration sensor unit 34c even after detecting that the acceleration sensor unit 34c is faulty. When the fault detection portion 356c stops detecting the failure in the acceleration sensor unit 34c, the operation change portion 357 may resume the reception stop portion 355 to be able to stop the reception operation of the LF reception portion 32.

The configuration of the fourth embodiment is similar to the configuration of the first embodiment except that the acceleration sensor unit 34c uses the different fault detection mode. The configuration of the fourth embodiment also allows the mobile device 3c to be capable of power saving by using the acceleration sensor unit 34c. It is possible to avoid unnecessarily continuing the operation for power saving when the acceleration sensor unit 34c fails.

Fifth Embodiment

The fifth embodiment is also available for the fault detection mode of the acceleration sensor unit 34 as described in the first through fourth embodiments. The description below shows the configuration of the fifth embodiment. The authentication system 1 according to the fifth embodiment is similar to the authentication system 1 according to the first embodiment except that a mobile device 3d is included instead of the mobile device 3.

<Schematic Configuration of the Mobile Device 3d>

The description below shows a schematic configuration of the mobile device 3d. the battery 31, the LF reception portion 32, the UHF transmission portion 33, an acceleration sensor unit 34d, and a mobile device control portion 35d. The mobile device 3d is similar to the mobile device 3 according to the first embodiment except that the acceleration sensor unit 34d is included instead of the acceleration sensor unit 34 and the mobile device control portion 35d is included instead of the mobile device control portion 35. The mobile device control portion 35d is similar to the mobile device control portion 35 according to the first embodiment except some different processes. The mobile device control portion 35d will be described in detail later.

<Schematic Configuration of the Acceleration Sensor Unit 34d>

Figure 22:
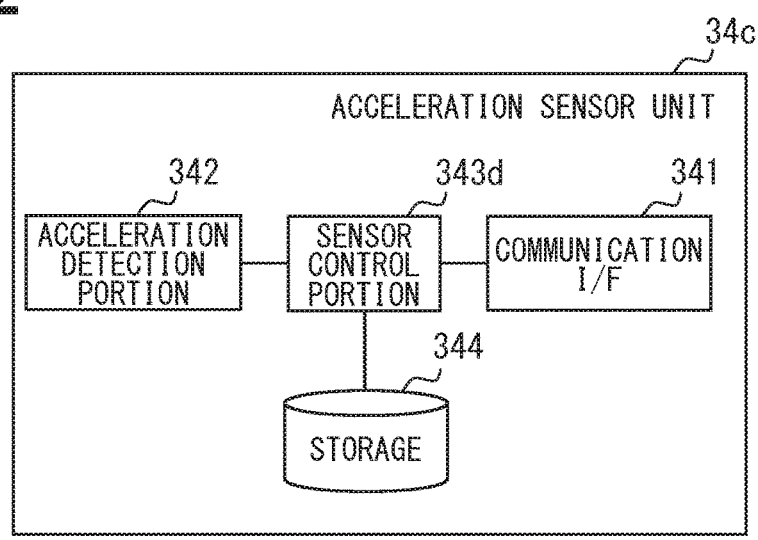
FIG. 22 is a diagram illustrating one example of a schematic configuration of the acceleration sensor unit.

With reference to FIG. 22, the description below shows a schematic configuration of the acceleration sensor unit 34d. As illustrated in FIG. 22, the acceleration sensor unit 34d includes the communication I/F 341, the acceleration detection portion 342, a sensor control portion 343d, and the storage portion 344. The acceleration sensor unit 34d is similar to the acceleration sensor unit 34 according to the first embodiment except that the sensor control portion 343d is included instead of the sensor control portion 343. The acceleration sensor unit 34d corresponds to an acceleration sensor described in the appended claims.

The sensor control portion 343d is similar to the sensor control portion 343 according to the first embodiment except that the sensor control portion 343d stores an acceleration detected by the acceleration detection portion 342 at a specific memory address of the storage portion 344 and reads the stored acceleration from the storage portion 344 for confirmation.

<Schematic Configuration of the Mobile Device Control Portion 35d>

Figure 23:
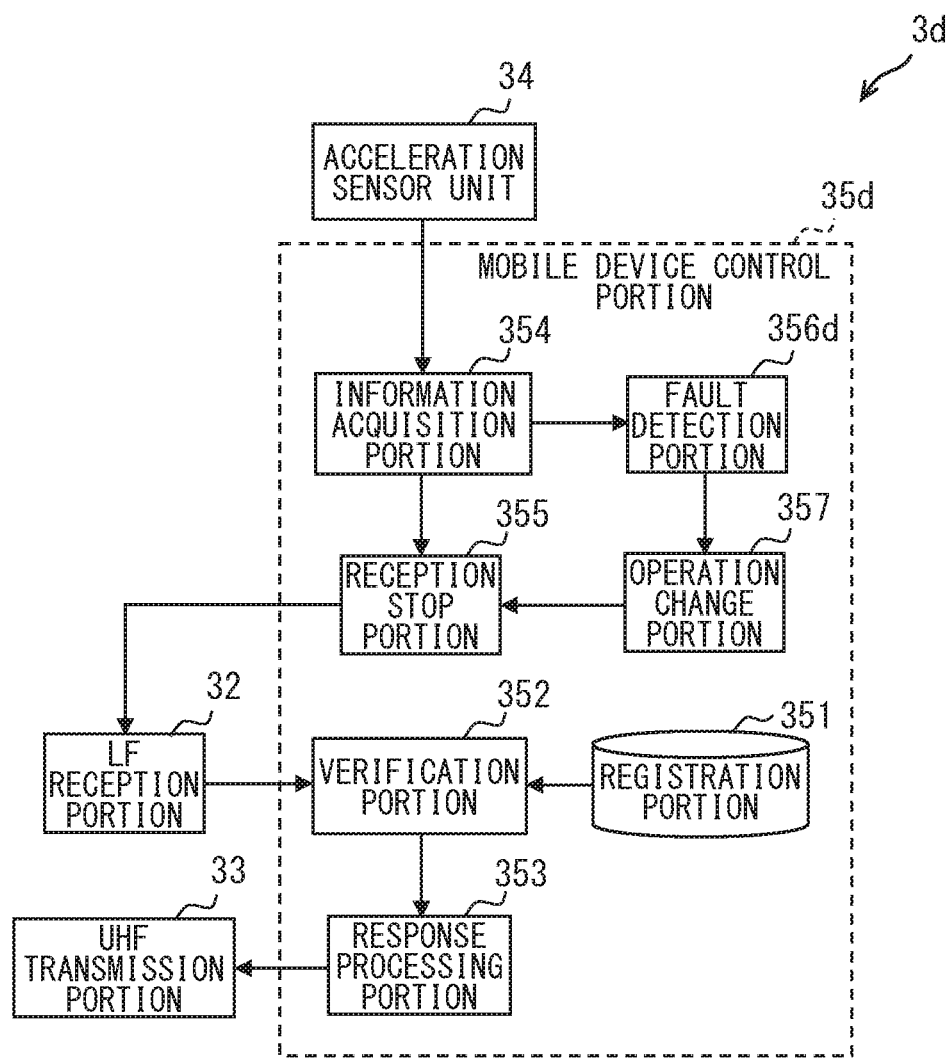
FIG. 23 is a diagram illustrating one example of a schematic configuration of the mobile device control portion.

With reference to FIG. 23, the description below shows a schematic configuration of the mobile device control portion 35d. As illustrated in FIG. 23, the mobile device control portion 35d includes function blocks such as the registration portion 351, the verification portion 352, the response processing portion 353, the information acquisition portion 354, the reception stop portion 355, a fault detection portion 356d, and the operation change portion 357. The mobile device control portion 35d is similar to the mobile device control portion 35 according to the first embodiment except that the fault detection portion 356d is included instead of the fault detection portion 356.

The fault detection portion 356d detects a failure of the acceleration sensor unit 34d by using a method different from that for the fault detection portion 356 according to the first embodiment. The fault detection portion 356d detects a failure of the acceleration sensor unit 34d based on abnormal communication with the acceleration sensor unit 34d. For example, the fault detection portion 356d may detect the failure in the acceleration sensor unit 34d when the information acquisition portion 354 of the mobile device control portion 35d comes to be unable to normally acquire outputs from the acceleration sensor unit 34d. For example, when a detection result from the acceleration detection portion 342 is written to the storage portion 344 at a specific memory address and the sensor control portion 343d reads the stored detection result for confirmation, an output value may differ from the written value or no output may be available. This state can be assumed to be unable to normally acquire outputs from the acceleration sensor unit 34d.

The fault detection portion 356d may continue detecting the failure in the acceleration sensor unit 34d even after detecting that the acceleration sensor unit 34d is faulty. When the fault detection portion 356d stops detecting the failure in the acceleration sensor unit 34d, the operation change portion 357 may resume the reception stop portion 355 to be able to stop the reception operation of the LF reception portion 32.

The configuration of the fifth embodiment is similar to the configuration of the first embodiment except that the acceleration sensor unit 34d uses the different fault detection mode. The configuration of the fifth embodiment also allows the mobile device 3d to be capable of power saving by using the acceleration sensor unit 34d. It is possible to avoid unnecessarily continuing the operation for power saving when the acceleration sensor unit 34d fails.

Sixth Embodiment

The first through fifth embodiments have provided the configuration that detects the vibration based on the acceleration change quantity from the acceleration sensor unit 34, 34c, or 34d. However, the configuration is not limited thereto. For example, the mobile device control portion 35, 35a, 35b, 35c, or 35d may detect the vibration by using results based on the change quantity of an acceleration detected by the acceleration sensor unit 34, 34c, or 34d. Besides, it may be favorable to detect the change quantity of an acceleration exceeding a predetermined threshold value instead of detecting the vibration.

Seventh Embodiment

The first through fifth embodiments have provided the configuration that applies the authentication system 1 to vehicles. However, the first and fourth embodiments may apply the authentication system 1 to others than vehicles. For example, the authentication system 1 may be applied to housing and facilities and may authenticate the door lock or unlock for housing and facilities.

Eighth Embodiment

The first through fifth embodiments have illustrated the configuration that uses the capacitance type MEMS acceleration sensor for the acceleration detection portions 342 and 342c. However, the first through third embodiments may use acceleration sensors other than the capacitance type MEMS acceleration sensor.

The present disclosure is not limited to the above-described embodiments but various modifications may be made within the scope of the appended claims. The technical scope of the present disclosure also covers an embodiment acquired by appropriately combining the technical arrangements disclosed in the different embodiments. For example, the fourth embodiment may be combined with the first embodiment, the second embodiment, or the third embodiment.

It is noted that a flowchart or the process of the flowchart in the present application includes multiple steps (also referred to as sections), each of which is represented, for instance, as S1. Further, each step can be divided into several sub-steps while several steps can be combined into a single step.

While various embodiments, configurations, and aspects of the mobile device and the authentication system according to the present disclosure have been exemplified, the embodiments, configurations, and aspects of the present disclosure are not limited to those described above.

The invention claimed is:

1. A mobile device for an authentication system configured to perform authentication to control an authentication target with code verification via near field wireless communication, the mobile device comprising:
   an acceleration sensor;
   a communication portion configured to perform the near field wireless communication with an antenna of the authentication target;
   a reception stop portion configured to stop reception operation of the communication portion based on a detection result from the acceleration sensor;
   a fault detection portion configured to detect a failure in the acceleration sensor; and
   an operation change portion configured to prevent the reception stop portion from stopping the reception operation of the communication portion when the fault detection portion detects the failure in the acceleration sensor.

2. The mobile device according to claim 1, wherein:
   the fault detection portion is configured to detect the failure in the acceleration sensor by performing a self-test for confirming operations of the acceleration sensor by forcibly applying voltage.

3. The mobile device according to claim 1, wherein:
the acceleration sensor includes a three axis acceleration sensor; and
the fault detection portion is configured to detect the failure in the acceleration sensor when a change quantity of an acceleration detected by the acceleration detection sensor continues to be smaller than or equal to a threshold value of the change quantity for a predetermined period and further a size of a resultant vector from three axis accelerations detected by the acceleration sensor exceeds a predetermined range using gravity acceleration of 1G as a reference.

4. The mobile device according to claim 1, wherein:
the fault detection portion is capable of communicating with the acceleration sensor and is configured to detect the failure in the acceleration sensor based on communication abnormality with the acceleration sensor.

5. The mobile device according to claim 1, wherein:
the mobile device is used for the authentication system configured to perform the authentication to control a vehicle with the code verification via the near field wireless communication; and
the communication portion is configured to perform the near field wireless communication with the antenna of the vehicle.

6. The mobile device according to claim 1, wherein:
the mobile device is used for the authentication system configured to perform the authentication to control a vehicle with the code verification via the near field wireless communication;
the communication portion is configured to perform the near field wireless communication with the antenna of the vehicle; and
the reception stop portion is configured to stop the reception operation of the communication portion after a moratorium based on the detection result from the acceleration sensor.

7. The mobile device according to claim 6, wherein:
the communication portion is configured to perform the near field wireless communication between an exterior verification antenna and an interior verification antenna;
a communication range of the exterior verification antenna extends toward an outside of a vehicle compartment of the vehicle;
a communication range of the interior verification antenna remains inside a vehicle compartment of the vehicle;
before the moratorium is exceeded, when exterior verification as the code verification using the near field wireless communication with the exterior verification antenna is performed and when, after the exterior verification, interior verification as the code verification using the near field wireless communication with the interior verification antenna is performed, the fault detection portion is configured to determine whether a state where a change quantity of an acceleration detected by the acceleration sensor exceeds a threshold value for the change quantity occurs since the exterior verification; and
the fault detection portion is configured to detect the failure in the acceleration sensor when determining that the state where the change quantity exceeds the threshold does not occur.

8. The mobile device according to claim 6, wherein:
the communication portion is configured to perform the near field wireless communication between an exterior verification antenna and an interior verification antenna;
the exterior verification antenna extends the communication range outside the vehicle compartment of the vehicle;
the interior verification antenna keeps the communication range inside the vehicle compartment of the vehicle;
before the moratorium is exceeded, when interior verification as the code verification using the near field wireless communication with the interior verification antenna is performed and when, after the interior verification, exterior verification as the code verification using the near field wireless communication with the exterior verification antenna is performed, the fault detection portion is configured to determine whether a state where a change quantity of an acceleration detected by the acceleration sensor exceeds a threshold value for the change quantity occurs since the interior verification; and
the fault detection portion is configured to detect the failure in the acceleration sensor when determining that the state where the change quantity exceeds the threshold value does not occur.

9. The mobile device according to claim 7, wherein:
before the moratorium is exceeded, when the interior verification as the code verification using the near field wireless communication with the interior verification antenna is performed and when, after the interior verification, the exterior verification as the code verification using the near field wireless communication with the exterior verification antenna is performed, the fault detection portion is configured to determine whether the state where the change quantity of the acceleration detected by the acceleration sensor exceeds the threshold value for the change quantity occurs since the interior verification; and
the fault detection portion is configured to detect the failure in the acceleration sensor when determining that the state where the change quantity exceeds the threshold value does not occur.

10. The mobile device according to claim 6, further comprising:
a signal strength indication portion configured to indicate a reception signal strength when the communication portion is configured to receive a signal transmitted from the antenna,
wherein:
before the moratorium is exceeded, when the signal strength portion is configured to indicate the reception signal strength of the signal successively transmitted by the antenna after door lock at a time of exit of an occupant from the vehicle and when the reception signal strength is lower than a predetermined value, the fault detection portion is configured to determine whether a state where a change quantity of an acceleration detected by the acceleration sensor exceeds a threshold value for the change quantity occurs since start of receiving the signal after the door lock; and
the fault detection portion is configured to detect the failure in the acceleration sensor when determining that the state where the change quantity exceeds the threshold value does not occur.

11. The mobile device according to claim 1, wherein:
the fault detection portion is configured to continue detecting the failure in the acceleration sensor even when the failure of the acceleration sensor is detected; and
when the fault detection portion is configured to stop detecting the failure in the acceleration sensor, the operation change portion is configured to enable the reception stop portion to stop the reception operation of the communication portion.

12. An authentication system comprising:
an instrument of an authentication target; and
a mobile device carried by a user,
wherein:
the instrument of the authentication target is configured to perform authentication to control the authentication target with code verification via near field wireless communication between an antenna of the authentication target and the mobile device; and
the mobile device includes:
an acceleration sensor;
a communication portion configured to perform the near field wireless communication with the antenna;
a reception stop portion configured to stop reception operation of the communication portion based on a detection result from the acceleration sensor;
a fault detection portion configured to detect a failure in the acceleration sensor; and
an operation change portion configured to prevent the reception stop portion from stopping the reception operation of the communication portion when the failure detection portion detects the failure in the acceleration sensor.

13. A mobile device for an authentication system configured to perform authentication to control an authentication target with code verification via near field wireless communication, the mobile device comprising:
an acceleration sensor;
one or more processors; and
a memory coupled to the one or more processors and storing program instructions that when executed by the one or more processors cause the one or more processors to at least:
perform the near field wireless communication with an antenna of the authentication target;
stop reception operation based on a detection result from the acceleration sensor;
detect a failure in the acceleration sensor; and
continue the reception operation when detecting the failure in the acceleration sensor.

* * * * *